US008358722B2

(12) United States Patent
Yuba et al.

(10) Patent No.: US 8,358,722 B2
(45) Date of Patent: Jan. 22, 2013

(54) SIGNAL PROCESSING APPARATUS, SIGNAL PROCESSING METHOD, AND RECEPTION SYSTEM

(75) Inventors: Tadaaki Yuba, Tokyo (JP); Takuya Okamoto, Chiba (JP); Yuken Goto, Tokyo (JP); Kenichi Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 333 days.

(21) Appl. No.: 12/833,409

(22) Filed: Jul. 9, 2010

(65) Prior Publication Data

US 2011/0013729 A1 Jan. 20, 2011

(30) Foreign Application Priority Data

Jul. 16, 2009 (JP) ................................ P2009-167497

(51) Int. Cl.
*H04L 27/06* (2006.01)
(52) U.S. Cl. ........................ 375/340; 370/206
(58) Field of Classification Search .......... 375/259–260, 375/316, 326, 340; 370/203, 206
See application file for complete search history.

(56) References Cited

U.S. PATENT DOCUMENTS 6,680,901 B1 * 1/2004 Yamamoto et al. ........... 370/208

| 2005/0213689 | A1 * | 9/2005 | Matsuda et al. | 375/324 |
| 2009/0207954 | A1 * | 8/2009 | Dai et al. | 375/345 |
| 2009/0268836 | A1 * | 10/2009 | Zhao et al. | 375/267 |

OTHER PUBLICATIONS

"Frame Structure Channel Coding and Modulation for a Second Generation Digital Terrestrial Television Broadcasting System (DVB-T2)" DVB Document A122 Jun. 2008.

* cited by examiner

*Primary Examiner* — Jean B Corrielus
(74) *Attorney, Agent, or Firm* — Frommer Lawrence & Haug LLP; William S. Frommer

(57) ABSTRACT

Disclosed herein is a signal processing apparatus including a processing block configured to perform a carrier shift amount detection process for detecting a carrier shift amount constituting a carrier error used for demodulating an orthogonal frequency division multiplexing signal known as the OFDM signal; and a correction block configured to correct the OFDM signal in accordance with the carrier shift amount. The OFDM signal includes a first preamble signal including subcarriers, and a second preamble signal including subcarriers of which the spacing is narrower than the spacing of the subcarriers included in the first preamble signal. The second preamble signal includes pilot signals which are known signals located at intervals of a predetermined number of subcarriers. The processing block detects the carrier shift amount using a correlation of the subcarriers included in one such second preamble signal.

16 Claims, 21 Drawing Sheets

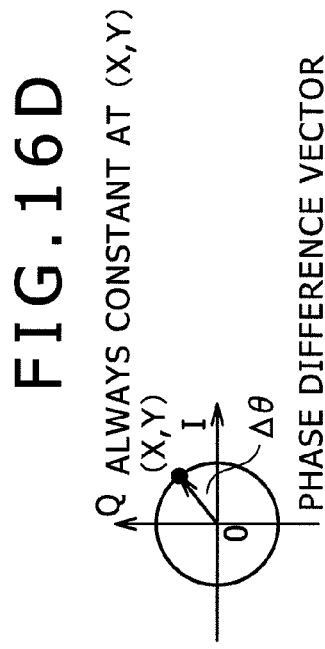
FIG.16C
P2 PILOT VECTORS ARE OFFSET TO ZERO WHEN SUMMED UP
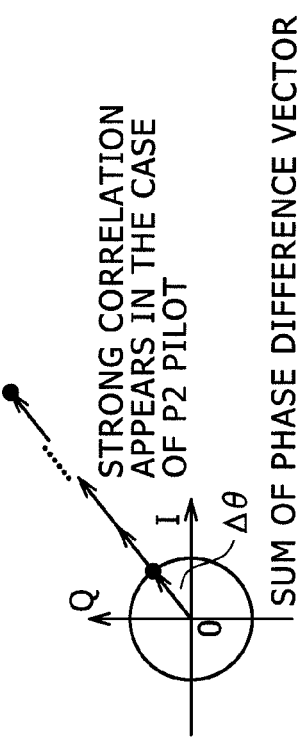
FIG.16D
PHASE DIFFERENCE VECTOR
FIG.16E
STRONG CORRELATION APPEARS IN THE CASE OF P2 PILOT
SUM OF PHASE DIFFERENCE VECTOR
FIG.16A
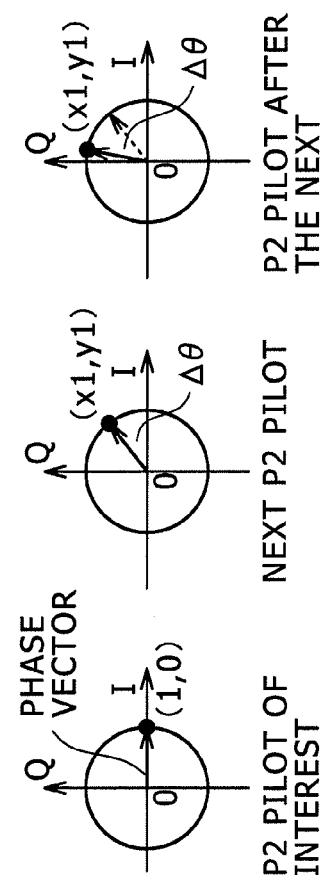
FIG.16B
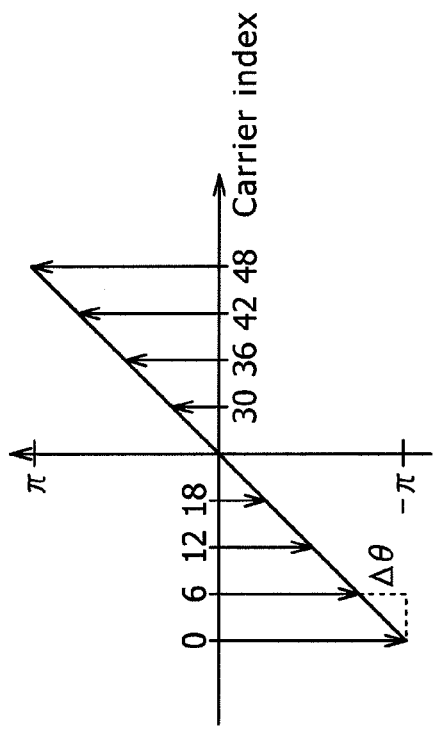
P2 PILOT OF INTEREST    NEXT P2 PILOT    P2 PILOT AFTER THE NEXT

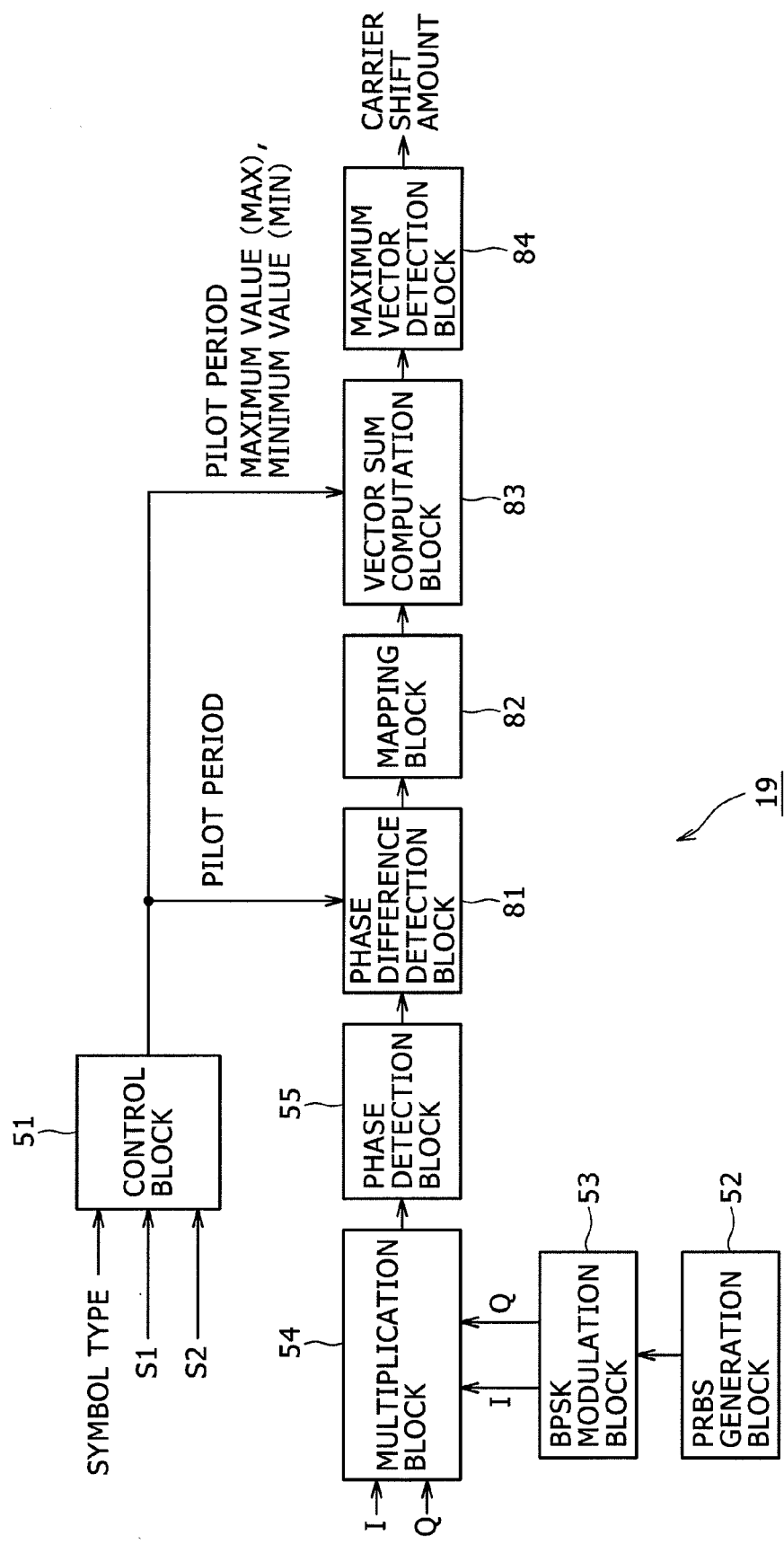

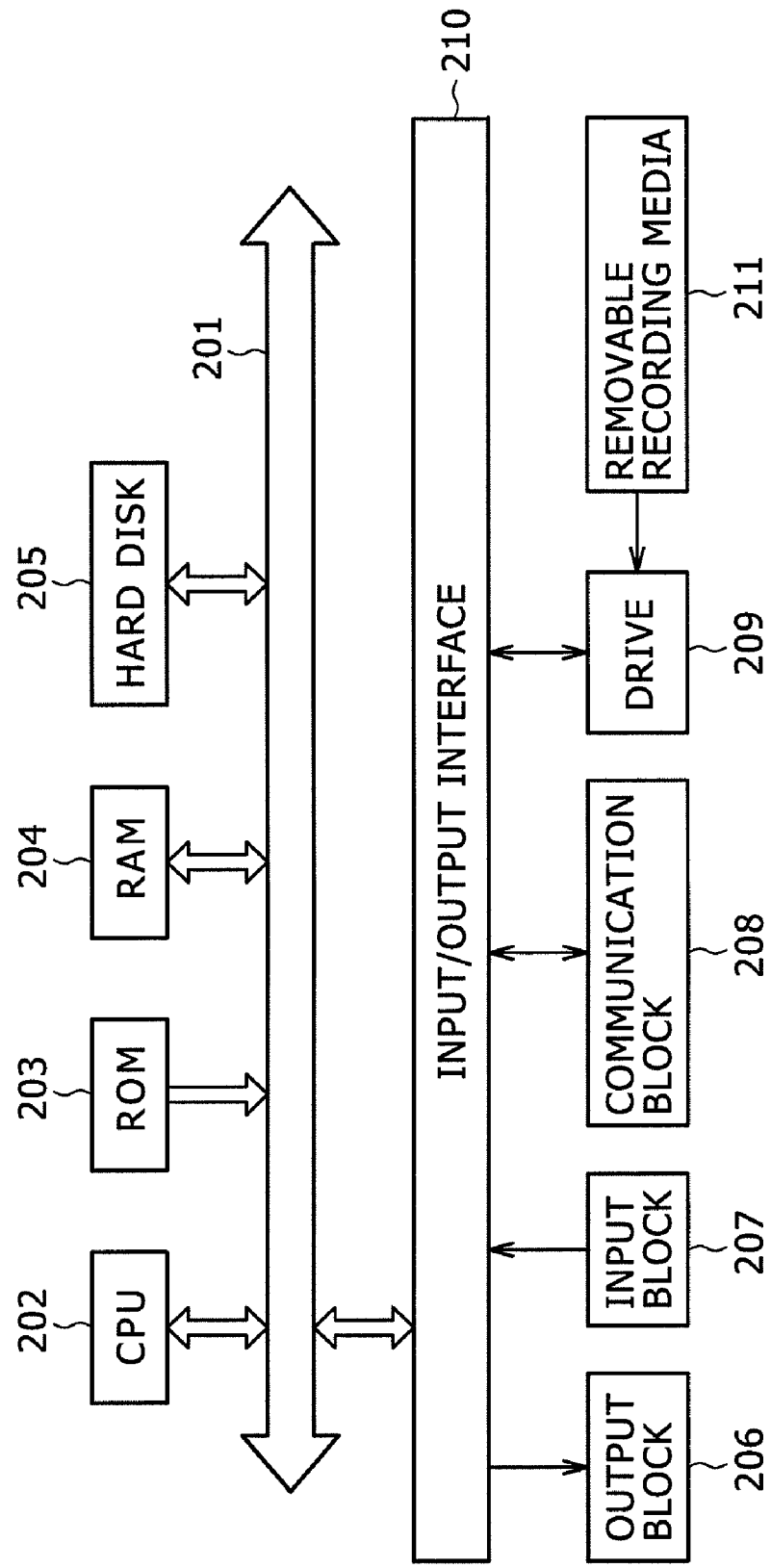

SIGNAL PROCESSING APPARATUS, SIGNAL PROCESSING METHOD, AND RECEPTION SYSTEM

The present application contains subject matter related to that disclosed in Japanese Priority Patent Application JP 2009-167497 filed in the Japan Patent Office on Jul. 16, 2009, the entire content of which is hereby incorporated by reference.

BACKGROUND OF THE INVENTION

1. Field of the Invention

The present invention relates to a signal processing apparatus, a signal processing method, and a reception system. More particularly, the invention relates to a signal processing apparatus, a signal processing method, and a reception system for estimating, rapidly and with required precision, errors of the carrier used illustratively to demodulate the OFDM (Orthogonal Frequency Division Multiplexing) signal.

2. Description of the Related Art

Terrestrial digital broadcasts and like broadcasting schemes adopt OFDM (Orthogonal Frequency Division Multiplexing) as their data (i.e., signal) modulation method.

Under OFDM, numerous orthogonal subcarriers are provided within the transmission band, each subcarrier being assigned data in its amplitude and phase for digital modulation such as PSK (Phase Shift Keying) and QAM (Quadrature Amplitude Modulation).

According to OFDM, the transmission band is divided into a large number of subcarriers. It means that for each subcarrier, the bandwidth is narrow and the modulation rate is low. However, the total transmission speed (of all subcarriers) is the same as that of ordinary modulation methods.

Since data is allocated to a plurality of subcarriers under OFDM as mentioned above, data modulation may be carried out by IFFT (Inverse Fast Fourier Transform) computation. The OFDM signal resulting from the modulation may be demodulated by FFT (Fast Fourier Transform) computation.

It follows that the transmission apparatus for transmitting the OFDM signal may be constituted using circuits performing IFFT computations and that the reception apparatus for receiving the OFDM signal may be formed using circuits effecting FFT computations.

Under OFDM, signal segments called guard intervals are provided to improve resistance to multipath interference. Also according to OFDM, pilot signals (i.e., signals known to the reception apparatus) are inserted discretely in the direction of time as well as in the direction of frequency. These pilot signals are used by the reception apparatus for synchronization and for estimating transmission channel characteristics.

Because of its high resistance to multipath interference, OFDM is adopted notably by terrestrial digital broadcasts that are vulnerable to the effects of such multipath interference. The terrestrial digital broadcasting standards adopting OFDM illustratively include DVB-T (Digital Video Broadcasting-Terrestrial) and ISDB-T (Integrated Services Digital Broadcasting-Terrestrial).

Under OFDM, data is transmitted in units called OFDM symbols.

Generally, the OFDM symbol is formed by effective symbols that constitute a signal period in which IFFT is performed in modulation, and by a guard interval made by a partial waveform of the latter half of the effective symbols being copied unmodified to the beginning of the effective symbols.

The guard interval attached to the beginning of the OFDM symbol helps enhance resistance to multipath interference.

The terrestrial digital broadcasting standards adopting OFDM define the unit called a frame (OFDM transmission frame) made up of a plurality of OFDM symbols. Data is then transmitted in units of frames.

The reception apparatus for receiving the above-described OFDM signal uses an OFDM signal carrier to effect digital orthogonal demodulation of the OFDM signal.

Generally, however, the OFDM signal carrier used by the reception apparatus for digital orthogonal demodulation does not coincide with the OFDM signal carrier employed by the transmission apparatus transmitting the OFDM signal; the carrier contains errors. That is, the frequency of the OFDM signal used for digital orthogonal demodulation is shifted from the center frequency of the OFDM signal (i.e., its IF (Intermediate Frequency) signal) received by the reception apparatus.

For that reason, the reception apparatus is arranged to perform two processes: a carrier shift amount detection process for detecting a carrier shift amount which is the error of the OFDM signal carrier used for digital orthogonal demodulation, and a correction process (i.e., offset correction) for correcting the OFDM signal in such a manner as to eliminate the carrier shift amount.

Meanwhile, DVB-T2 (Digital Video Broadcasting-Second Generation Terrestrial in Europe) is being worked out as a terrestrial digital broadcasting standard that adopts OFDM.

The so-called BlueBook (DVB BlueBook A122) describes DVB-T2 ("Frame structure channel coding and modulation for a second generation digital terrestrial television broadcasting system (DVB-T2)," DVB Document A122, June 2008; called Non-Patent Document 1 hereunder).

Under DVB-T2 (as set forth in BlueBook), a frame called the T2 frame is defined. Data is transmitted in units of T2 frames.

A T2 frame (representing the OFDM signal) includes two preamble signals called P1 and P2 that contain information necessary for processes such as OFDM signal demodulation.

FIG. 1 is a schematic view showing the format of a T2 frame. The T2 frame contains P1 symbols, P2 symbols, and data symbols, in that order.

The P1 symbols are symbols for transmitting P1 signaling including a transmission type and basic transmission parameters.

More specifically, the P1 signaling (P1) symbols include parameters S1 and S2 indicating whether P2 symbols are transmitted by the SISO (Single Input Single Output (meaning one transmitting and one receiving antenna)) method or by the MISO (Multiple Input, Single Output (meaning multiple transmitting antennas but one receiving antenna)) method. The parameters also indicate the FFT size (i.e., number of samples (symbols) subject to a single FFT computation) for performing FFT computation of P2.

It follows that to demodulate P2 may require demodulating P1 beforehand.

The P2 symbols are symbols for transmitting L1 pre-signaling and L1 post-signaling.

The L1 pre-signaling includes information for allowing the reception apparatus receiving T2 frames to receive and decode the L1 post-signaling. The L1 post-signaling includes parameters required by the reception apparatus in gaining access to the physical layer (i.e., to the physical layer pipes).

One T2 frame may have P2 of 1 to 16 OFDM symbols disposed therein.

The P1 and P2 symbols include known pilot signals. Specifically, pilot signals of P1 are disposed on the subcarriers that are not periodically located, whereas pilot signals of P2 are disposed on the subcarriers that are periodically located. Of the pilot signals, those located periodically at intervals of a predetermined number of subcarriers (symbols) are called SP (Scattered Pilot) signals; the pilot signals disposed on the subcarriers of the same frequency are called CP (Continual Pilot) signals.

Also, the reception apparatus performs FFT computation of the OFDM signal per OFDM symbol. DVB-T2 defines six FFT sizes, 1 K, 2 K, 4 K, 8 K, 16 K, and 32 K, each FFT size being the number of symbols (subcarriers) making up one OFDM symbol.

The spacing between the subcarriers of OFDM symbols (i.e., subcarrier spacing) is inversely proportional to the FFT size of the OFDM symbol. Thus under DVB-T2, defining the FFT size is equivalent to stipulating the subcarrier spacing.

DVB-T2 also stipulates that, of the six above-mentioned FFT sizes, 1 K should be used for the OFDM symbols of P1. It is further stipulated that for P2 and other OFDM symbols other than P1, any one of the six FFT sizes above may be used.

It follows that regarding the OFDM symbols of P1, solely the subcarriers having the widest subcarrier spacing (corresponding to the FFT size of 1 K) defined by DVB-T2 are used.

With regard to P2 and other OFDM symbols other than P1, that is, OFDM symbol of P2 and OFDM symbol of data (Normal), it is possible to use not only the subcarriers having the widest subcarrier spacing defined by DVB-T2, but also the subcarriers having a subcarrier spacing other than the widest subcarrier spacing (i.e., any one of the spacings corresponding to the FFT sizes of 2 K, 4 K, 8 K, 16 K, and 32 K).

FIG. 2 is a schematic view showing an OFDM signal of P1.

The OFDM signal of P1 has 1 K (=1024) symbols as its effective symbols.

This signal has a cyclic structure in which a starting part A1 of the effective symbols A is frequency-shifted to a signal C copied ahead of the effective symbols and the remaining part A2 of the effective symbols A is frequency-shifted to a signal B copied behind the effective symbols.

The OFDM signal of P1 has 853 subcarriers as its effective subcarriers. Under DVB-T2, information is located on 384 subcarriers out of the 853 subcarriers.

The implementation guidelines of DVB-T2 (ETSI TR 102 831: IG) say that if the transmission band for transmitting the OFDM signal is illustratively 8 MHz, then the correlation of information location on the above-mentioned 384 subcarriers regarding the OFDM signal of P1 may be used to estimate a "coarse" carrier frequency offset with accuracy of up to ±500 kHz.

The implementation guidelines also say that in the case of P1, the cyclic structure explained above in reference to FIG. 2 may be used to estimate a "fine" carrier frequency offset with accuracy of up to ±0.5 multiplied by the subcarrier spacing.

DVB-T2 stipulates that the FFT size of P1 should be 1 K samples (symbols) as mentioned above.

DVB-T2 also stipulates that if the transmission band is illustratively 8 MHz, then the sampling period for P1 with the FFT size of 1 K samples should be 7/64 µs.

Thus when the transmission band is illustratively 8 MHz, the effective symbol length $T_u$ of P1 is 1024×7/64 µs.

Meanwhile, there exists the relation defined by the expression $D=1/T_u$, where $T_u$ (in seconds) denotes the length of the effective symbols out of the OFDM symbols (i.e., effective symbol length excluding guard intervals), and D (in Hz) represents the subcarrier spacing of the subcarriers of the OFDM signal.

Thus if the transmission band is 8 MHz, the subcarrier spacing D of the subcarriers of P1 is approximately 8,929 Hz, which is the inverse of the effective symbol length $T_u=1024\times 7/64$ µs.

As described, because the subcarrier spacing D of P1 is about 8,929 Hz, the "fine" carrier shift amount can be estimated using P1 with an accuracy of ±8,929/2 Hz.

In this case, the capture range of P1, i.e., the range into which the carrier of the OFDM signal used for digital orthogonal demodulation may be captured by correcting the OFDM signal in keeping with the "fine" carrier shift amount obtained from P1, is within ±8,929/2 Hz (between −8929/2 Hz and +8929/2 Hz) in reference to the true value of the OFDM signal carrier.

Given the carrier shift amount estimated using P1 with the FFT size of 1 K, it is possible to capture the carrier of the OFDM symbols having the FFT size of 1 K into the range of ±0.5×subcarrier spacing D, whereby the OFDM symbols are demodulated.

SUMMARY OF THE INVENTION

However, with regard to the OFDM symbols having the FFT size other than 1 K, i.e., the OFDM symbols with the FFT size of 2 K, 4 K, 8 K, 16 K, or 32 K, it may not be possible to capture the carrier into the range of ±0.5×subcarrier spacing D depending on the carrier shift amount estimated using P1 with the FFT size of 1 K.

Illustratively, if the transmission band is 8 MHz, the subcarrier spacing D for the OFDM symbols with the FFT size of 32 K is 279 Hz.

It follows that even if the carrier can be captured into the range of ±8,929/2 Hz based on the carrier shift amount estimated using P1 with the FFT size of 1 K, the carrier shift amount (i.e., its magnitude) may still be in excess of 279 Hz multiplied by ±0.5 constituting the subcarrier spacing D for the OFDM symbols with the FFT size of 32 K.

As described above, it is not possible to demodulate the OFDM symbols in the presence of the carrier shift amount (of one subcarrier or more) exceeding the subcarrier spacing D for the OFDM symbols multiplied by ±0.5.

In an environment where there exist such external perturbations as multipath interference or continuous waves (CW), P1 tends to be detected erroneously. If the erroneously detected P1 is used to estimate the "fine" carrier shift amount, the accuracy involved is significantly lowered. As a result, there is a high possibility that the OFDM symbols with the FFT size of 2 K, 4 K, 8 K, 16 K, or 32 K will not be demodulated.

As mentioned above, with regard to the OFDM symbols with the FFT size of 2 K, 4 K, 8 K, 16 K, or 32 K, there are cases in which the OFDM symbols may not be demodulated because of the inability to capture the carrier into the range of ±0.5 multiplied by the subcarrier spacing D, depending on the carrier shift amount estimated using P1 with the FFT size of 1 K.

In order to capture the carrier into the range of ±0.5 multiplied by the subcarrier spacing D regarding the OFDM symbols with the FFT size of 2 K, 4 K, 8 K, 16 K, or 32 K, it may be necessary to estimate the "coarse" carrier shift amount for each of the FFT sizes of 2 K, 4 K, 8 K, 16 K, and 32 K in addition to the estimation of the carrier shift amount using P1.

The implementation guidelines introduce general methods for estimating the "coarse" carrier shift amount for each FFT size illustratively under DVB-T (Digital Video Broadcasting-Second Generation Terrestrial in Europe).

Specifically, the implementation guidelines disclose the method for estimating the carrier frequency offset using CP locations as well as the carrier frequency offset estimation method that utilizes SP impulse responses.

After the carrier is captured into the range of ±0.5 multiplied by the subcarrier spacing D regarding the OFDM symbols with each FFT size, the "fine" carrier shift amount relative to each FFT size can be estimated illustratively using a correlator that utilizes the guard interval length or a correlator that makes use of the phase difference in the direction of the OFDM symbols of CP (in the direction of time).

Meanwhile, the reception apparatus for receiving the OFDM signal according to DVB-T2 demodulates the P1 signaling and estimates the guard interval length in the T2 frame in which P1 is first detected at the time of so-called channel scan.

Thereafter, the reception apparatus recognizes the FFT size of P2 for detecting the starting location of FFT computation (FFT window trigger location) on P2 in the next T2 frame. The reception apparatus then carries out FFT computation of P2 to obtain the OFDM signal of the frequency domain. Once the OFDM signal of the frequency domain starts getting acquired, it is possible to demodulate the L1 pre-signaling (FIG. 1) included in P2, followed by the demodulation of data.

Suppose now that the FFT size of P2 is 2 K, 4 K, 8 K, 16 K, or 32 K, i.e., the carrier spacing of P2 is narrower than that of P1, and that the accuracy of the estimation of the carrier shift amount using P1 has dropped. In that case, it may be necessary to estimate the "coarse" carrier shift amount for the FFT size of P2 in order to correct the OFDM signal.

For example, the T2 frame may contain two or more P2 symbols. In such a case, it is possible to estimate the "coarse" carrier shift amount for the FFT size of P2 based on the correlation between two adjacent P2 symbols.

However, if the T2 frame contains only one P2 symbol, then obviously the correlation between two adjacent P2 symbols may not be acquired. In such a case, the "coarse" carrier shift amount may not be estimated based on the two adjacent P2 symbols typically until a T2 frame including at least two P2 symbols is transmitted.

Meanwhile, the "coarse" carrier shift amount regarding the FFT size of P2 may be estimated illustratively using the CP locations.

Under DVB-T2, eight CP location patterns are defined. The L1 pre-signaling of P2 (FIG. 1) includes information as to which of the eight CP location patterns corresponds to the pattern of the CP locations contained in the OFDM signal of interest. Thus when the L1 pre-signaling may not be demodulated upon channel scan, it is impossible to adopt the carrier frequency offset estimation method based on the CP locations.

The present invention has been made in view of the above circumstances and provides a signal processing apparatus, a signal processing method, and a reception system for estimating the carrier shift amount quickly and with required accuracy.

In carrying out the present invention and according to one embodiment thereof, there is provided a signal processing apparatus including: processing means for performing a carrier shift amount detection process for detecting a carrier shift amount constituting a carrier error used for demodulating an orthogonal frequency division multiplexing signal known as the OFDM signal; and correction means for correcting the OFDM signal in accordance with the carrier shift amount; wherein the OFDM signal includes: a first preamble signal including subcarriers; and a second preamble signal including subcarriers of which the spacing is narrower than the spacing of the subcarriers included in the first preamble signal; wherein the second preamble signal includes pilot signals which are known signals located at intervals of a predetermined number of subcarriers; and wherein the processing means detects the carrier shift amount using a correlation of the subcarriers included in one such second preamble signal.

According to another embodiment of the present invention, there is provided a signal processing method including the steps of: causing a signal processing apparatus to perform a carrier shift amount detection process for detecting a carrier shift amount constituting a carrier error used for demodulating an orthogonal frequency division multiplexing signal known as the OFDM signal; and causing the signal processing apparatus to correct the OFDM signal in accordance with the carrier shift amount; wherein the OFDM signal includes: a first preamble signal including subcarriers; and a second preamble signal including subcarriers of which the spacing is narrower than the spacing of the subcarriers included in the first preamble signal; wherein the second preamble signal includes pilot signals which are known signals located at intervals of a predetermined number of subcarriers; and wherein the carrier shift amount detection process detects the carrier shift amount using a correlation of the subcarriers included in one such second preamble signal.

According to a further embodiment of the present invention, there is provided a reception system including: a transmission channel decode processing block configured to perform a transmission channel decoding process on a signal acquired via a transmission channel, the transmission channel decoding process including at least the process of correcting errors having occurred on the transmission channel; and an information source decode processing block configured to perform an information source decoding process on the signal having undergone the transmission channel decoding process, the information source decoding process including at least the process of expanding compressed information back to the original information; wherein the signal acquired via the transmission channel is an orthogonal frequency division multiplexing signal known as the OFDM signal obtained by performing at least compression coding for information compression and error correcting coding for correcting the errors having occurred on the transmission channel; wherein the transmission channel decode processing block includes: processing means for performing a carrier shift amount detection process for detecting a carrier shift amount constituting a carrier error used for demodulating the OFDM signal; and correction means for correcting the OFDM signal in accordance with the carrier shift amount; wherein the OFDM signal includes: a first preamble signal including subcarriers; and a second preamble signal including subcarriers of which the spacing is narrower than the spacing of the subcarriers included in the first preamble signal; wherein the second preamble signal includes pilot signals which are known signals located at intervals of a predetermined number of subcarriers; and wherein the processing means detects the carrier shift amount using a correlation of the subcarriers included in one such second preamble signal.

According to an even further embodiment of the present invention, there is provided a reception system including: a transmission channel decode processing block configured to perform a transmission channel decoding process on a signal acquired via a transmission channel, the transmission channel decoding process including at least the process of correcting errors having occurred on the transmission channel; and an output block configured to output images and sounds based on the signal having undergone the transmission channel decoding process; wherein the signal acquired via the transmission channel is an orthogonal frequency division multiplexing signal known as the OFDM signal obtained by performing at least error correcting coding for correcting the errors having occurred on the transmission channel; wherein the transmission channel decode processing block includes: processing means for performing a carrier shift amount detection process for detecting a carrier shift amount constituting a carrier error used for demodulating the OFDM signal; and correction means for correcting the OFDM signal in accordance with the carrier shift amount; wherein the OFDM signal includes: a first preamble signal including subcarriers; and a second preamble signal including subcarriers of which the spacing is narrower than the spacing of the subcarriers included in the first preamble signal; wherein the second preamble signal includes pilot signals which are known signals located at intervals of a predetermined number of subcarriers; and wherein the processing means detects the carrier shift amount using a correlation of the subcarriers included in one such second preamble signal.

According to a still further embodiment of the present invention, there is provided a reception system including: a transmission channel decode processing block configured to perform a transmission channel decoding process on a signal acquired via a transmission channel, the transmission channel decoding process including at least the process of correcting errors having occurred on the transmission channel; and a recording block configured to record the signal having undergone the transmission channel decoding process; wherein the signal acquired via the transmission channel is an orthogonal frequency division multiplexing signal known as the OFDM signal obtained by performing at least error correcting coding for correcting the errors having occurred on the transmission channel; wherein the transmission channel decode processing block includes: processing means for performing a carrier shift amount detection process for detecting a carrier shift amount constituting a carrier error used for demodulating the OFDM signal; and correction means for correcting the OFDM signal in accordance with the carrier shift amount; wherein the OFDM signal includes: a first preamble signal including subcarriers; and a second preamble signal including subcarriers of which the spacing is narrower than the spacing of the subcarriers included in the first preamble signal; wherein the second preamble signal includes pilot signals which are known signals located at intervals of a predetermined number of subcarriers; and wherein the processing means detects the carrier shift amount using a correlation of the subcarriers included in one such second preamble signal.

According to a yet further embodiment of the present invention, there is provided a reception system including: acquisition means for acquiring a signal via a transmission channel; and a transmission channel decode processing block configured to perform a transmission channel decoding process on the signal acquired via the transmission channel, the transmission channel decoding process including at least the process of correcting errors having occurred on the transmission channel; wherein the signal acquired via the transmission channel is an orthogonal frequency division multiplexing signal known as the OFDM signal obtained by performing at least error correcting coding for correcting the errors having occurred on the transmission channel; wherein the transmission channel decode processing block includes: processing means for performing a carrier shift amount detection process for detecting a carrier shift amount constituting a carrier error used for demodulating the OFDM signal; and correction means for correcting the OFDM signal in accordance with the carrier shift amount; wherein the OFDM signal includes: a first preamble signal including subcarriers; and a second preamble signal including subcarriers of which the spacing is narrower than the spacing of the subcarriers included in the first preamble signal; wherein the second preamble signal includes pilot signals which are known signals located at intervals of a predetermined number of subcarriers; and wherein the processing block detects the carrier shift amount using a correlation of the subcarriers included in one such second preamble signal.

Where any one of the above-outlined embodiments of the present invention is in use, the carrier shift amount detection process is carried out to detect the carrier shift amount constituting the carrier error used for demodulating the OFDM (Orthogonal Frequency Division Multiplexing) signal. The OFDM signal is corrected in keeping with the detected carrier shift amount. The OFDM signal has the first preamble signal including subcarriers and the second preamble signal including subcarriers of which the spacing is narrower than the spacing of the subcarriers included in the first preamble signal. The second preamble signal further includes pilot signals which are known signals located at intervals of a predetermined number of subcarriers. The carrier shift amount is detected using the correlation of the subcarriers included in one such second preamble signal.

The signal processing apparatus and reception system of the present invention may each be an independent apparatus. Alternatively, the inventive signal processing apparatus and reception system may be an internal block or blocks constituting part of an independent apparatus.

According to the present invention embodied as outlined above, the carrier shift amount may be estimated, illustratively with required accuracy at high speed.

BRIEF DESCRIPTION OF THE DRAWINGS

FIGS. 16A, 16B, 16C, 16D and 16E are schematic views explanatory of a third estimation method for estimating the carrier shift amount;

FIG. 17 is a block diagram showing a typical structure of a preamble processing block for detecting the carrier shift amount using the third estimation method;

FIG. 23 is a block diagram showing a typical structure of a computer to which the present invention is applied.

DETAILED DESCRIPTION OF THE PREFERRED EMBODIMENTS

[Typical Structure of the Signal Processing Apparatus]

Figure 3:
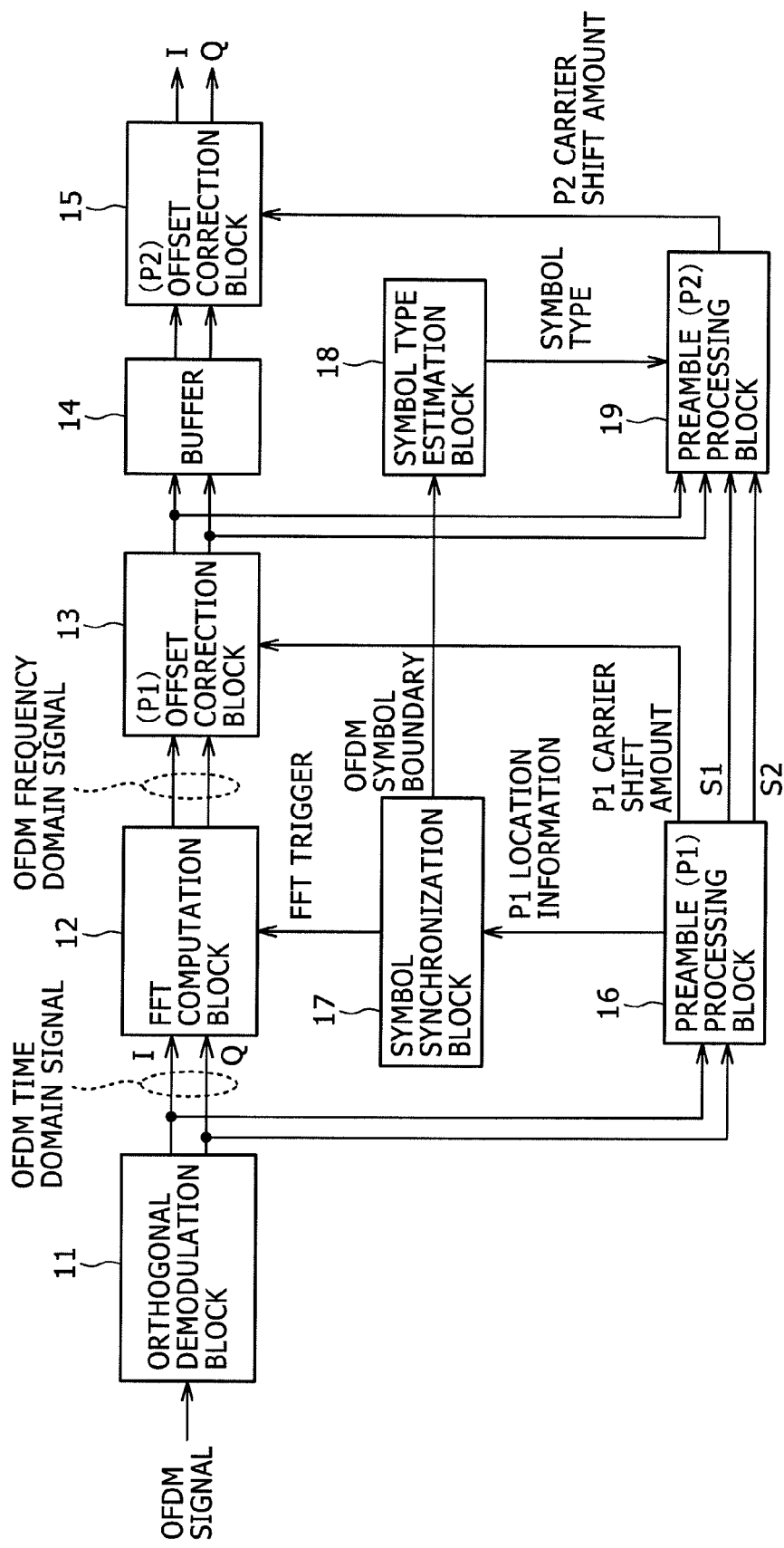
FIG. 3 is a block diagram showing a typical structure of a signal processing apparatus as one embodiment of the present invention.

FIG. 3 is a block diagram showing a typical structure of a signal processing apparatus as one embodiment of the present invention.

In FIG. 3, the signal processing apparatus functions as a demodulation device that demodulates the OFDM signal under DVB-T2.

More specifically, the signal processing apparatus in FIG. 3 includes an orthogonal demodulation block 11, an FFT computation block 12, an offset correction block 13, a buffer 14, an offset correction block 15, a preamble processing block 16, a symbol synchronization block 17, a symbol type estimation block 18, and a preamble processing block 19.

The orthogonal demodulation block 11 is fed with an OFDM signal (i.e., its IF (Intermediate Frequency) signal) from a transmission apparatus transmitting the OFDM signal in question.

The orthogonal demodulation block 11 performs digital orthogonal demodulation of the supplied OFDM signal using a carrier of a predetermined frequency (carrier frequency; ideally, the carrier should be the same as that used by the transmission apparatus) and a signal orthogonal to that carrier. The resulting OFDM signal of the baseband is then output by the orthogonal demodulation block 11.

It should be noted that the OFDM signal output by the orthogonal demodulation block 11 is a signal in the time domain in effect before FFT computation (immediately after the symbols of an IQ constellation (i.e., data transmitted by a single subcarrier) have been subjected to IFFT computation). This signal may be called the OFDM time domain signal hereunder where appropriate.

The OFDM time domain signal is a complex signal expressed in complex numbers including a real axis component (I (In Phase) component) and an imaginary axis component (Q (Quadrature Phase) component).

The OFDM time domain signal is supplied from the orthogonal demodulation block 11 to the FFT computation block 12 and preamble processing block 16.

In accordance with FFT trigger information fed from the symbol synchronization block 17, the FFT computation block 12 extracts an OFDM time domain signal of the FFT size (sampled data of the signal) out of the OFDM time domain signal coming from the orthogonal demodulation block 11 and performs FFT computation, i.e., fast computation of DFT (Discrete Fourier Transform).

That is, the FFT trigger information supplied from the symbol synchronization block 17 to the FFT computation block 12 represents the starting location of that segment of the OFDM time domain signal which is subject to FFT computation, as well as the size of the signal segment in question (FFT size).

In keeping with the FFT trigger information thus fed from the symbol synchronization block 17, the FFT computation block 12 extracts from the starting location indicated by the FFT trigger information an OFDM time domain signal of the segment corresponding to the FFT size denoted by the same FFT trigger information, as the OFDM time domain signal of the segment subject to FFT computation (called the FFT segment hereunder where appropriate).

In the manner described above, the symbols of the effective symbol length excluding guard intervals (i.e., their symbols) are ideally extracted from the symbols constituting a single OFDM symbol included in the OFDM time domain signal, as the OFDM time domain signal of the FFT segment.

The FFT computation block 12 proceeds to perform FFT computation on the OFDM time domain signal of the FFT segment (symbols of the effective symbol length).

The FFT computation effected by the FFT computation block 12 on the OFDM time domain signal provides the information transmitted by the subcarriers, i.e., the OFDM signal representative of the symbols in the IQ constellation.

The OFDM signal obtained through the FFT computation of the OFDM time domain signal is a signal in the frequency domain and thus may be called the OFDM frequency domain signal hereunder where appropriate.

The FFT computation block 12 supplies the offset correction block 13 with the OFDM frequency domain signal obtained through the FFT computation.

The offset correction block 13 is also fed with a P1 carrier shift amount coming from the preamble processing block 16 in addition to the OFDM frequency domain signal from the FFT computation block 12.

The P1 carrier shift amount is a carrier shift amount estimated using P1. As such, the P1 carrier shift amount includes a "coarse" carrier shift amount and a "fine" carrier shift amount regarding the FFT size (1 K) of P1.

In keeping with the P1 carrier shift amount coming from the preamble processing block 16, the offset correction block 13 corrects the OFDM frequency domain signal from the FFT computation block 12 in such a manner as to bring the P1 carrier shift amount to zero. The offset correction block 13 then supplies the corrected OFDM frequency domain signal to the buffer 14 and preamble processing block 19.

The buffer 14 temporarily accommodates the OFDM frequency domain signal coming from the offset correction block 13, before feeding the signal to the offset correction block 15.

The offset correction block 15 is also supplied with a P2 carrier shift amount coming from the preamble processing block 19 in addition to the OFDM frequency domain signal from the buffer 14.

The P2 carrier shift amount is a carrier shift amount estimated using P2. The P2 carrier shift amount constitutes the "fine" carrier shift amount for the FFT size of P2 (1 K, 2 K, 4 K, 8 K, 16 K, or 32 K). This carrier shift amount is an offset that can be captured (relatively) into the range of ±0.5×subcarrier spacing D, the carrier being one used by the orthogonal demodulation block 11.

In accordance with the P2 carrier shift amount coming from the preamble processing block 19, the offset correction block 15 corrects the OFDM frequency domain signal from the buffer 14 in such a manner as to bring the P2 carrier shift amount to zero. The offset correction block 15 proceeds to supply the corrected OFDM frequency domain signal illustratively to blocks, not shown, for performing necessary processes including equalization and error correction.

The preamble processing block 16 detects P1, which is a typical first preamble signal, from the OFDM time domain signal fed from the orthogonal demodulation block 11. Using the detected P1, the preamble processing block 16 estimates "coarse" and "fine" carrier shift amounts.

The "coarse" and the "fine" carrier shift amounts estimated by the preamble processing block 16 using P1 with regard to the FFT size (1 K) of P1 constitute the P1 carrier shift amount. The preamble processing block 16 then forwards the P1 carrier shift amount containing the "coarse" and the "fine" carrier shift amounts to the offset correction block 13.

The preamble processing block 16 extracts S1 and S2 from P1 and feeds the extracted S1 and S2 to the preamble processing block 19.

Also, the preamble processing block 16 supplies the symbol synchronization block 17 with P1 location information which is included in the OFDM time domain signal from the orthogonal demodulation block 11 and which represents the P1 location on the OFDM time domain signal in question, with the FFT size recognized from S1 and S2 included in P1, and with information necessary for estimating the location of the OFDM symbol boundary.

The symbol synchronization block 17 creates FFT trigger information from the P1 location information and FFT size coming from the preamble processing block 16, and sends the created information to the FFT computation block 12.

Also, the symbol synchronization block 17 estimates the boundary location of the OFDM symbol from the information furnished by the preamble processing block 16, and supplies the symbol type estimation block 18 with the signal indicative of the boundary location as a symbol synchronization signal.

Based on the symbol synchronization signal from the symbol synchronization block 17, the symbol type estimation block 18 estimates the symbol type of the OFDM symbol of the OFDM frequency domain signal sent from the offset correction block 13 to the preamble processing block 19, and feeds the estimated symbol type to the preamble processing block 19.

The symbol type indicates whether the OFDM symbol of the OFDM frequency domain signal is P1, P2, an OFDM symbol of data, or an FCS (Frame Closing Symbol).

The preamble processing block 19 performs a carrier shift amount detection process for estimating (i.e., detecting) the "coarse" carrier shift amount with regard to the FFT size of P2, i.e., a typical second preamble signal containing the subcarrier of which the spacing is narrower than that of the subcarriers contained in a first preamble signal, the first and the second preamble signals being included in the OFDM frequency domain signal fed from the offset correction block 13.

That is, the preamble processing block 19 first detects P2 included in the OFDM frequency domain signal coming from the offset correction block 13, on the basis of the symbol type furnished by the symbol type estimation block 18.

Then based on S1 and S2 supplied by the preamble processing block 16, the preamble processing block 19 recognizes the FFT size of P2 included in the OFDM frequency domain signal fed from the offset correction block 13. With the FFT size thus recognized, the preamble processing block 19 estimates the "coarse" carrier shift amount relative to the FFT size in question.

The preamble processing block 19 proceeds to supply the offset correction block 15 with the "coarse" carrier shift amount with regard to the FFT size of P2 as the P2 carrier shift amount.

The preamble processing block 16 estimates the "coarse" carrier shift amount regarding the FFT size of P2, using the correlation of one P2, i.e., the correlation of the subcarriers included in P2 of one OFDM symbol, in a manner to be discussed later.

The preamble processing block 19 can thus estimate the carrier shift amount quickly and with a degree of accuracy required for demodulating P2, even when only one P2 is included in the T2 frame.

Where a plurality of P2's (i.e., multiple OFDM symbols) are included in the T2 frame, the preamble processing block 19 may estimate the carrier shift amount using either one of the plurality of P2's or two or more P2's out of the multiple P2's.

There are illustratively three estimation methods, the first, the second, and the third, by which The preamble processing block 19 estimates the "coarse" carrier shift amount with regard to the FFT size of P2 using the correlation of the subcarriers included in a single P2.

The first to the third methods are common to one another in that they utilize the correlation of the subcarriers at intervals of a predetermined number of subcarriers included in P2.

In computing subcarrier correlations, each of the first to the third estimation methods is distinct from the others as follows: the first estimation method uses the power value corresponding to the power of each subcarrier (symbol); the second estimation method utilizes the phase of each subcarrier; and the third estimation method employs the phase difference of each subcarrier.

[First Method for Estimating the Carrier Shift Amount]

What follows is a description of the first estimation method for estimating the carrier shift amount using subcarrier correlation computed by utilizing the power value corresponding to the power of each subcarrier.

Figure 4:
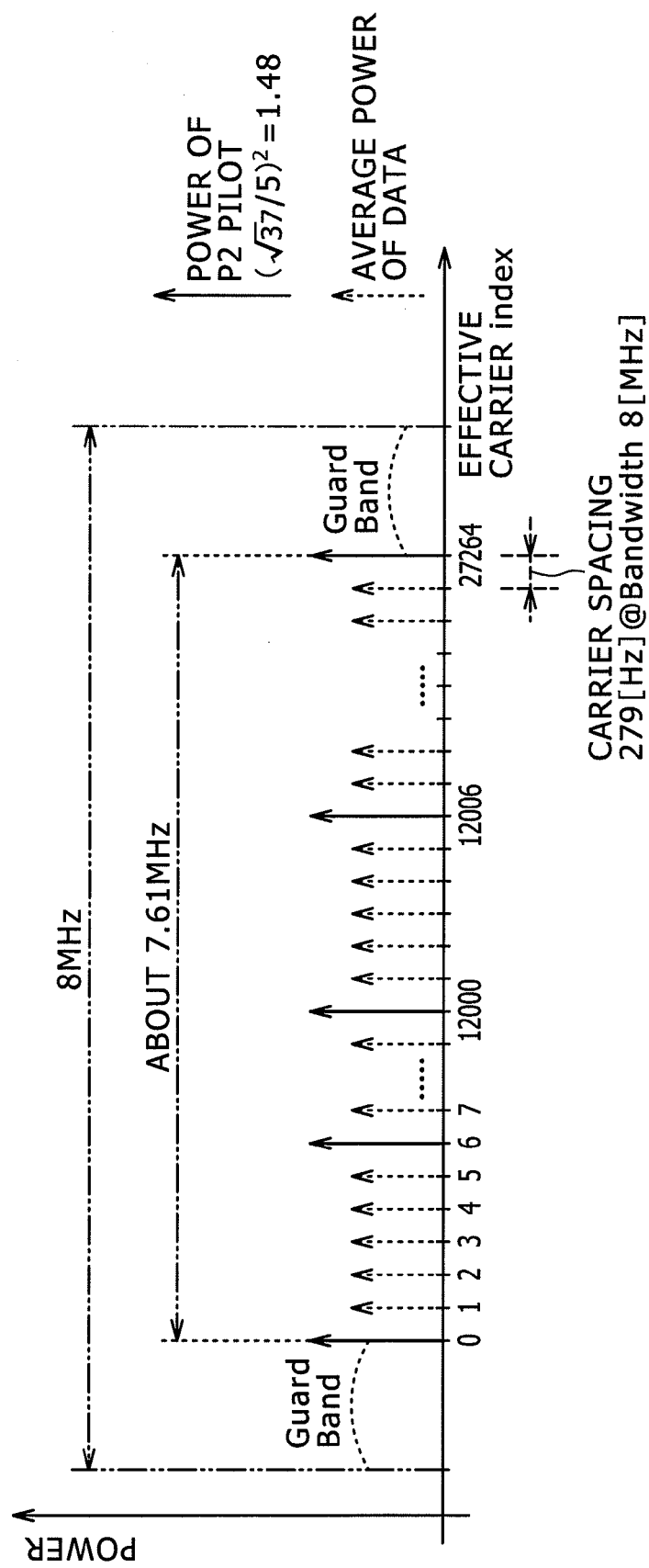
FIG. 4 is a schematic view showing power values of an OFDM frequency domain signal.

FIG. 4 shows power values of an OFDM frequency domain signal.

In FIG. 4, the horizontal axis stands for indexes (i.e., frequencies) identifying the subcarriers of the OFDM frequency domain signal, and corresponds to a frequency. Also, the vertical axis denotes power values.

Figure 1:
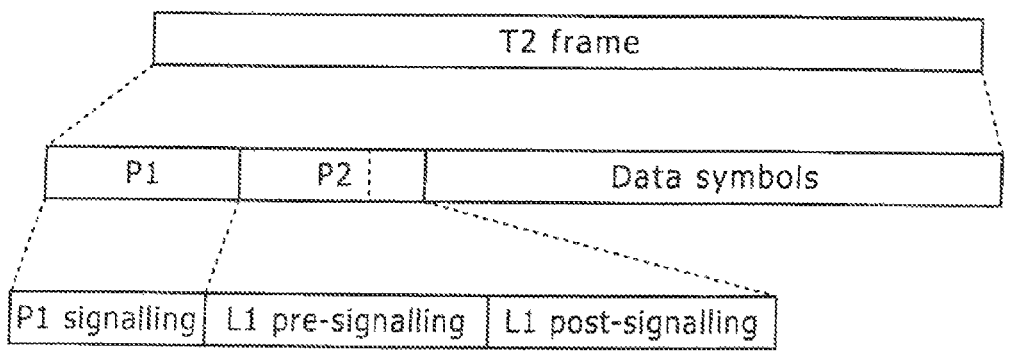
FIG. 1 is a schematic view showing the format of a T2 frame.

In P2, as discussed above in reference to FIG. 1, pilot signals (P2 pilots) are located on the subcarriers that are located periodically.

That is, according to DVB-T2 with regard to the P2 of which the FFT size is 32 K and which is in the SISO format (in SISO mode), pilot signals are to be located on the subcarriers k of which the index #k should satisfy the expression mod(k, 6)=0; regarding the other P2's, pilot signals are to be located on the subcarriers #k of which the index #k should satisfy the expression mod(k, 3)=0.

It should be noted that mod(A, B) represents the remainder of the division of A by B. The indexes #k are ordered as follows: index #0 is attached to the subcarrier having the lowest frequency, and the indexes #k of ascending integers are attached to the subcarriers with ascending frequencies respectively.

In P2, pilot signals are located on all extended carriers. In P2 in MISO mode, pilot signals are located on two subcarriers at both ends of the normal carrier.

From what has been discussed above, it can be seen that pilot signals are located at least on subcarriers #0, #6, ..., #6n, etc. ("n" is an integer of larger than 0) in the P2 of which the FFT size is 32 K and which is in SISO mode (in the description that follows, subcarriers #0, #6, ..., #6n, etc., may also be said to be the pilot signals). In the other P2's, pilot signals are located at least on subcarriers #0, #3, ..., #3n, etc.

DVB-T2 also stipulates that the amplitude of the subcarriers of the pilot signals in the P2 of which the FFT size is 32 K and which is in SISO mode should be $\sqrt{37}/5$ and that the amplitude of the subcarriers of the pilot signals in the other P2's should be $\sqrt{31}/5$.

DVB-T2 further stipulates that the average power of the subcarriers for the data in the OFDM frequency domain signal should be 1.0.

FIG. 4 shows typical power values of the P2 (of the OFDM frequency domain signal) of which the FFT size is 32 K and which is in SISO mode.

As indicated, the P2 of which the FFT size is 32 K and which is in SISO mode has 27,265 subcarriers ranging from subcarrier #0 to subcarrier #27,264, as effective subcarriers.

In the P2 of which the FFT size is 32 K and which is in SISO mode, as described above, the subcarriers #0, #6, ..., #6n, etc., constitute pilot signals, and a pilot signal is located every six subcarriers. Furthermore, the power of the pilot signal is $1.48=(\sqrt{37}/5)^2$, which means the amplitude ($\sqrt{37}/5$) squared.

Meanwhile, the average power of the data subcarriers in P2 is 1.0 as mentioned above.

As described above, there exists a difference in power (called the boost value difference) between the pilot signal subcarrier and the data subcarrier in P2.

According to the first estimation method, the difference in power between the pilot signal subcarrier and the data subcarrier is utilized for computing the correlation of the subcarriers.

In the P2 of which the FFT size is 32 K and which is in SISO mode, the pilot signals are located on the subcarriers #k of which the index #k satisfies the expression mod(k, 6)=0 as mentioned above. That means the pilot signals are located periodically, i.e., at intervals of six subcarriers. The period of subcarriers over which a pilot signal is located (every 6 subcarriers in this example) may be called the pilot period hereunder where appropriate.

In the P2's other than that of which the FFT size is 32 K and which is in SISO mode, the pilot signals are located on the subcarriers #k of which the index #k satisfies the expression mod(k, 3)=0. In this case, the pilot period is 3.

Figures 5A, 5B:
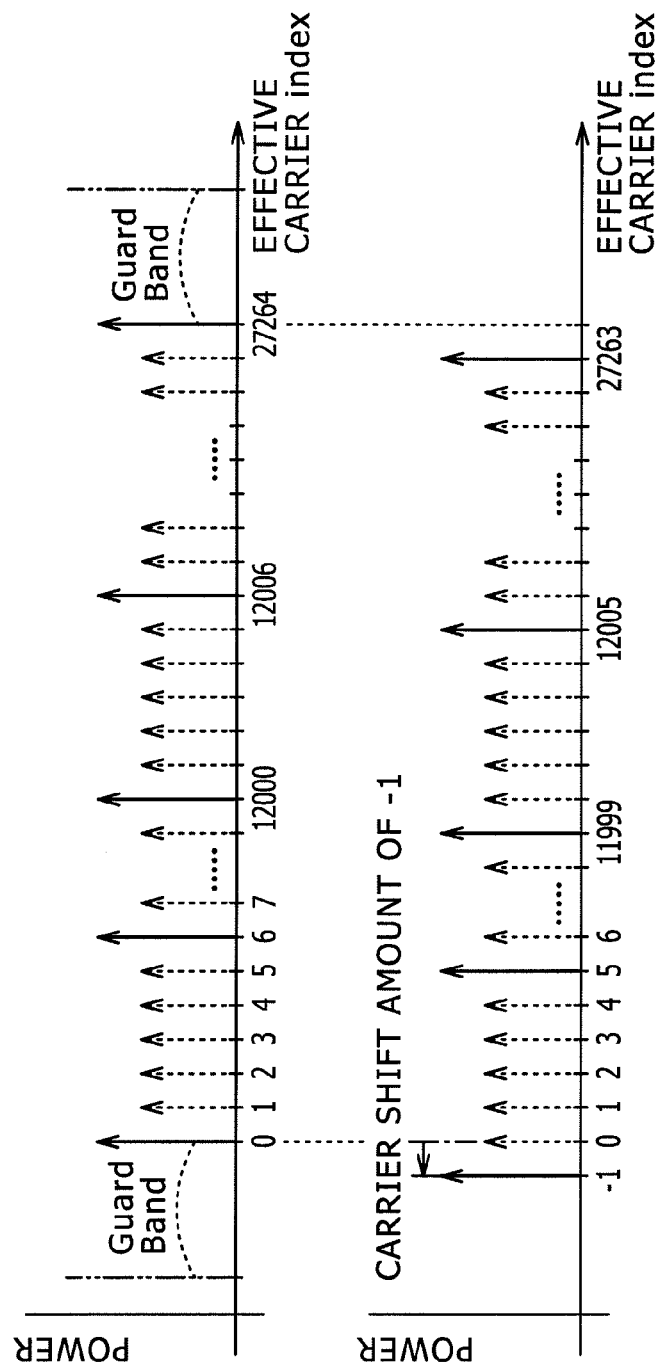
FIGS. 5A and 5B are schematic views showing a P2 with zero carrier shift amount and a P2 with a carrier shift amount of −1.

FIGS. 5A and 5B schematically show a P2 with zero carrier shift amount and a P2 with a carrier shift amount of −1.

In FIGS. 5A and 5B, the horizontal axis and the vertical axis are the same as those in FIG. 4.

The sign (positive or negative) of a carrier shift amount indicates the direction in which subcarriers are shifted in their locations (frequencies). That is, if the carrier shift amount is positive, that means the subcarriers involved are shifted in the direction of higher frequencies; if the carrier shift amount is negative, the subcarriers are shifted in the direction of lower frequencies.

The magnitude of the carrier shift amount (in absolute value) is expressed the magnitude of the subcarrier shift amount in reference to the subcarrier spacing D being regarded as 1.

It follows that the carrier shift amount of −1 denotes a shift of the subcarrier by the subcarrier spacing D in the direction of lower frequencies.

FIG. 5A shows a P2 of which the carrier shift amount is 0, while FIG. 5B indicates a P2 of which the carrier shift amount is −1.

The P2's in FIGS. 5A and 5B are each a P2 of which the FFT size is 32 K and which is in SISO mode.

In the P2 of which the FFT size is 32 K and which is in SISO mode, pilot signals are located at intervals of six subcarriers as mentioned above. The amount of the carrier shift amount does not affect the pilot signals being located at intervals of six subcarriers.

Figures 6A, 6B:
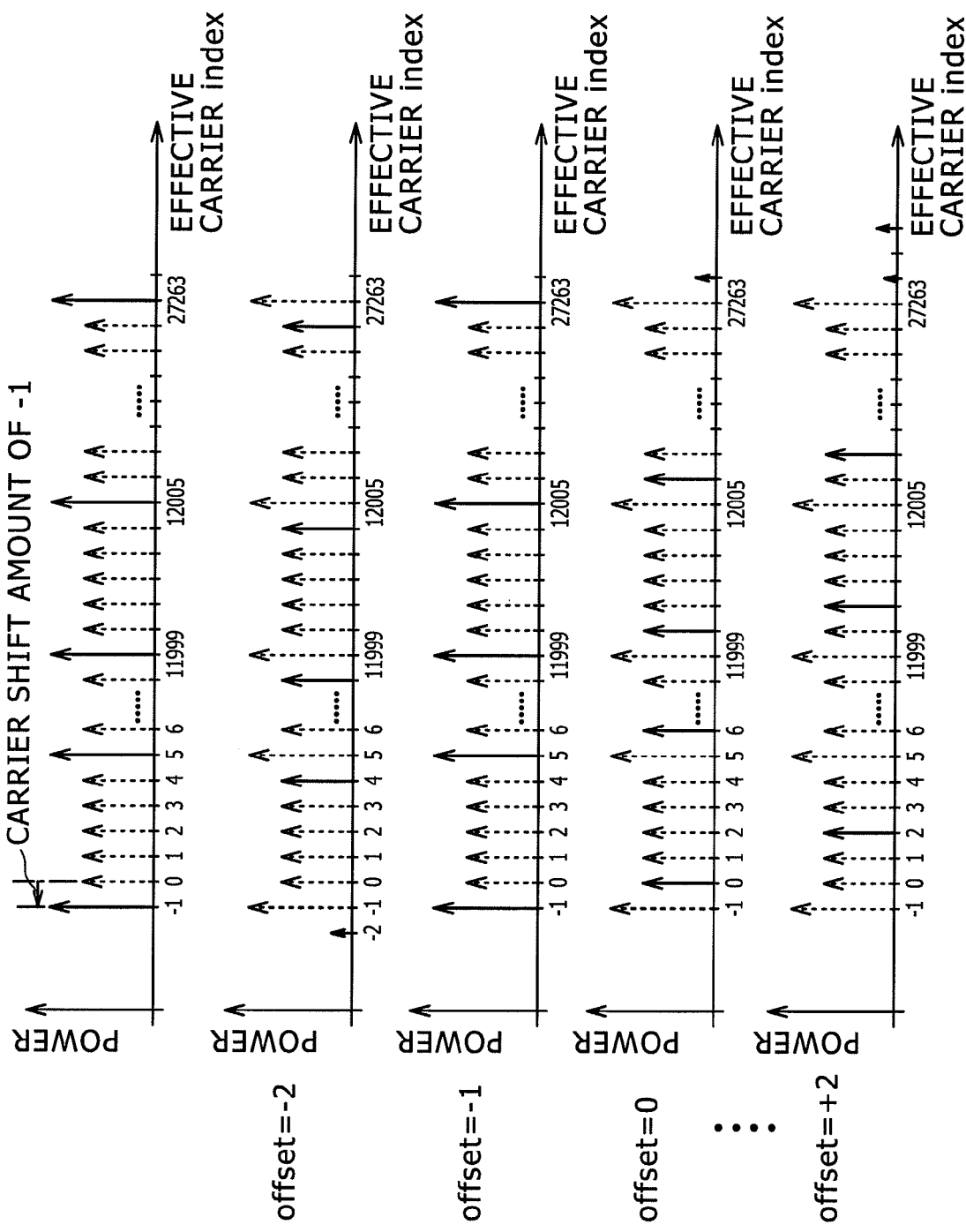
FIGS. 6A and 6B are schematic views showing a P2 included in the OFDM frequency domain signal (i.e., actual P2) and an actual P2 having subcarriers subject to subcarrier correlation computation.

FIGS. 6A and 6B schematically show a P2 included in the OFDM frequency domain signal (i.e., actual P2) fed to the preamble processing block 19 (FIG. 3), and an actual P2 having subcarriers subject to subcarrier correlation computation.

Specifically, FIG. 6A indicates a typical actual P2.

The actual P2 in FIG. 6A is the same as the P2 shown in FIG. 5B, of which the FFT size is 32 K, which is in SISO mode, and of which the carrier shift amount is −1.

In the actual P2 of FIG. 6A, adding its carrier shift amount of −1 to the index #k satisfying the expression mod(k, 6)=0 provides an index #k' (=k−1) indicative of the locations (frequencies) on which subcarriers #−1, #5, ..., #6n−1, ..., #27,263 are shown located.

FIG. 6B shows the subcarriers subject to the subcarrier correlation computation to be performed on the actual P2 where the carrier shift amount is assumed to be equal to an offset amount (offset).

If the offset amount is, say, −2, then the subcarriers subject to the subcarrier correlation computation are subcarriers #−2, #4, #6n−2, ..., #27,262 found on the locations denoted by the index #k' (=k−2) obtained by adding the offset amount (=−2) to the index #k satisfying the expression mod(k, 6)=0 of P2.

If the offset amount (offset) is illustratively −1, then the subcarriers subject to the subcarrier correlation computation are subcarriers #−1, #5, ..., #6n−1, ..., #27,263 found on the locations denoted by the index #k' (=k−1) obtained by adding the offset amount (=−1) to the index #k satisfying the expression mod(k, 6)=0 of P2.

In like manner, the subcarriers subject to the subcarrier correlation computation are subcarriers #0+offset, #6+offset, ..., #6n+offset, etc., found on the locations denoted by the index #k' (=k+offset) obtained by adding the offset amount (offset) to the index #k satisfying the expression mod(k, 6)=0 of P2.

That is, for purpose of simplification and illustration, where the P2 of which the carrier shift amount is zero and where a predetermined offset amount (offset) is given, the subcarriers subject to the subcarrier correlation computation are those located at intervals of the pilot period (a predetermined number; 6 in this example) starting from the location determined by shift from the first subcarrier in P2 by the offset amount (i.e., point "0+offset")

According to the first estimation method, the power value corresponding to the subcarrier power such as the power itself is used for computing the subcarrier correlation.

That is, where the first estimation method is adopted, the point reached by shift from the first subcarrier of P2 by the offset amount is regarded as the origin (0+offset), and the sum of the power values of the subcarriers located at intervals of the pilot period (a predetermined number of subcarriers) starting from the origin is computed as the subcarrier correlation.

The subcarrier correlation is acquired using each of varying offset amounts (offsets) within a predetermined range.

In the ensuing description, the smallest and the largest values of the range in which the offset amount (offset) is varied will be referred to as the minimum value (MIN) and maximum value (MAX) of the offset amount (offset), respectively. How to obtain the minimum (MIN) and maximum (MAX) values of the offset amount (offset) will be described later.

In FIG. 6B, the minimum (MIN) and maximum (MAX) values of the offset amount (offset) are assumed to be −2 and +2, respectively. With regard to each of the offset amounts of −2, −1, 0, . . . , +2, the sum of the power values of the subcarriers at intervals of six subcarriers (constituting the pilot period) is computed as the subcarrier correlation.

Where the offset amount (offset) coincides with the carrier shift amount of −1 for the actual P2 in FIG. 6A, the point reached by shift from the first subcarrier of P2 by the offset amount (i.e., 0+offset) is regarded as the origin. From that point (0+offset) on, the subcarriers found every six subcarriers constituting the pilot period are pilot signals. The sum of the power values of these subcarriers thus amounts to the sum of the power values of the pilot signals (corresponding to the subcarriers).

On the other hand, where the offset amount (offset) does not coincide with the carrier shift amount of −1 for the actual P2 in FIG. 6A, the point reached by shift from the first subcarrier of P2 by the offset amount (i.e., 0+offset) is also considered the origin. From that point (0+offset) onward, the subcarriers found every six subcarriers making up the pirot period are data (and not pilot signals). The sum of the power values of these subcarriers thus amounts to the sum of the power values of the data subcarriers.

As discussed above, the amplitude of the subcarriers of the pilot signals in the P2 of which the FFT size is 32 K and which is in SISO mode is √37/5, and the amplitude of the subcarriers of the pilot signals in the other P2's is √31/5. Also, the average power of the subcarriers for the data in the OFDM frequency domain signal is 1.0.

Thus, starting from the origin "0+offset" reached by shift from the first subcarrier of P2 by the offset amount (offset), the sum of the power values of the subcarriers at intervals of six subcarriers constituting the pilot period, obtained as the subcarrier correlation, tends to be large if the subcarriers subject to the subcarrier correlation computation are pilot signals. The sum of the power values of the subcarriers tends to be small if these subcarriers subject to the subcarrier correlation computation are data subcarriers.

According to the first estimation method, with regard to each of a plurality of offset amounts (offsets) ranging from the minimum value (MIN) to the maximum value (MAX), the sum of the power values of the subcarriers located at intervals of the pilot period is computed as the subcarrier correlation starting from the location determined by shift from the first subcarrier of P2 by the offset amount (offset) in effect. After this, the largest of the sums of the power values obtained with regard to each of the multiple offset amounts (offsets) is detected. The offset amount (offset) corresponding to the largest sum of the power values is then detected as the carrier shift amount (P2 carrier shift amount).

[Preamble Processing Block 19 Detecting the Carrier Shift Amount Using the First Estimation Method]

Figure 7:
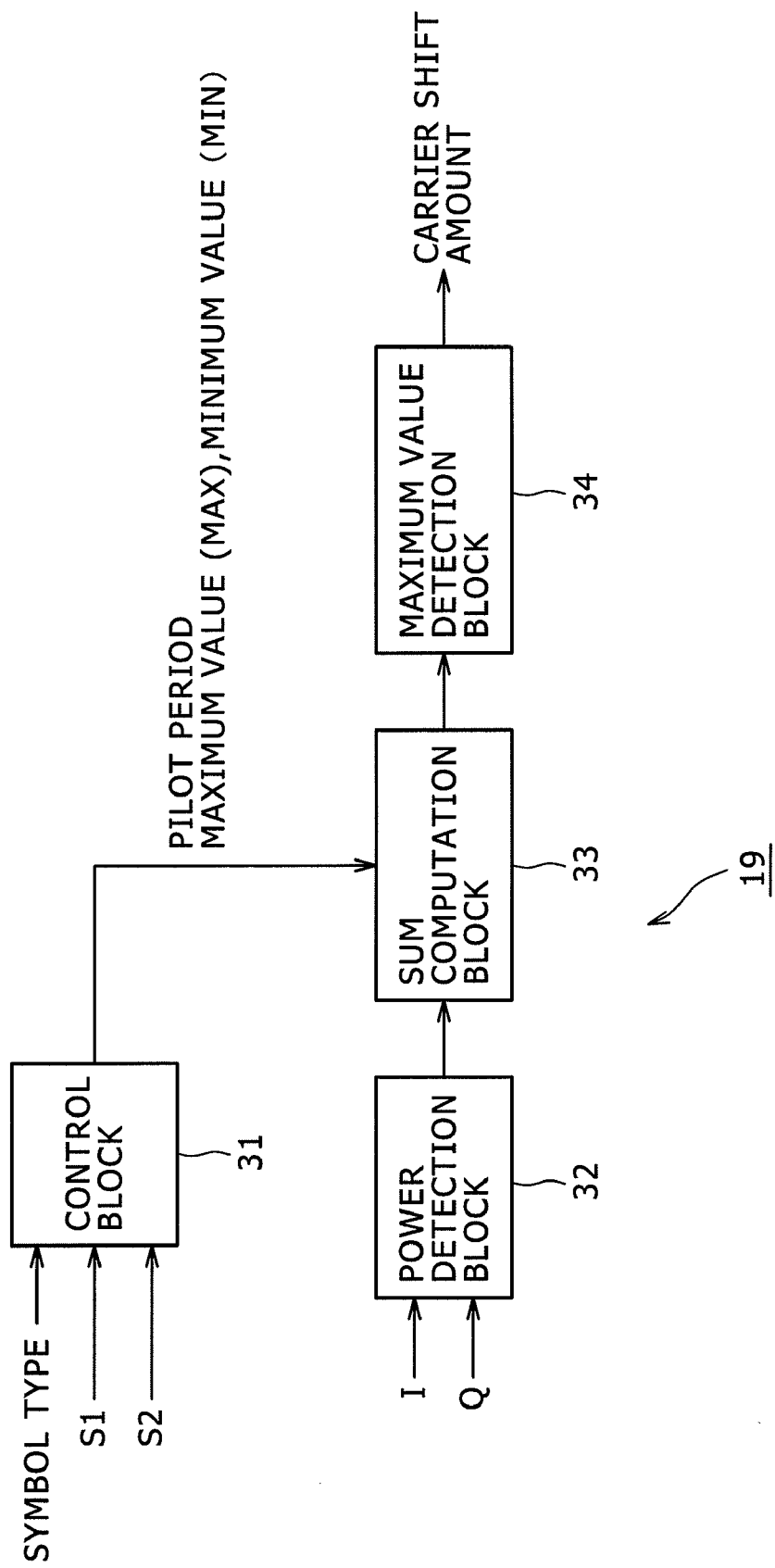
FIG. 7 is a block diagram showing a typical structure of a preamble processing block for detecting a carrier shift amount using a first estimation method.

FIG. 7 is a block diagram showing a typical structure of the preamble processing block 19 (FIG. 3) detecting the carrier shift amount using the first estimation method.

In FIG. 7, the preamble processing block 19 includes a control block 31, a power detection block 32, a sum computation block 33, and a maximum value detection block 34.

The control block 31 is fed with a symbol type from the symbol type estimation block 18 (FIG. 3) and S1 and S2 from the preamble processing block 16.

Based on the symbol type coming from the symbol type estimation block 18, the control block 31 recognizes a supply timing at which the offset correction block 13 (FIG. 3) supplies the preamble processing block 19 with P2 included in the OFDM frequency domain signal.

The control block 31 then controls the power detection block 32, sum computation block 33, and maximum value detection block 34 constituting the preamble processing block 19 in such a manner as to process P2, i.e., the OFDM frequency domain signal supplied at the recognized supply timing.

Also, the control block 31 recognizes the FFT size and the transmission mode (SISO or MISO) of P2 based on S1 and S2 coming from the preamble processing block 16 (FIG. 3).

With the FFT size and transmission mode of P2 recognized, the control block 31 recognizes the pilot period of the pilot signals of P2, and sends the recognized pilot period to the sum computation block 33.

Furthermore, the control block 31 obtains the minimum value (MIN) and maximum value (MAX) of the offset amount (offset) and supplies the sum computation block 33 therewith.

According to DVB-T2, as mentioned above, the P2 of which the FFT size is 32 K and which is in SISO mode has the pilot period of 6; the other P2's have the pilot period of 3.

Suppose that the pilot period is represented by $T_p$. In that case, the control block 31 obtains the minimum value (MIN) in accordance with the expression $MIN=-INT[(T_p-1)/2]$, and acquires the maximum value (MAX) in keeping with the expression $MAX=+INT[(T_p-1)/2]$, where $INT[A]$ is the largest integer not exceeding A.

The power detection block 32 is fed with the OFDM frequency domain signal from the offset correction block 13 (FIG. 3). The power detection block 32 detects illustratively the power itself of each subcarrier in one OFDM symbol of P2, as the power value corresponding to the power of the subcarrier in question included in P2 as part of the OFDM frequency domain signal coming from the offset correction block 13. The power value thus detected is sent to the sum computation block 33.

The power detection block 32 may detect not the power of each subcarrier but the amplitude of the subcarrier in question as the power value. If that is the case, then the subsequent processing is performed using the subcarrier amplitude.

Using the subcarrier power of one OFDM signal of P2 (i.e., one P2) coming from the power detection block 32, the sum computation block 33 computes as the subcarrier correlation the sum of the power values of the subcarriers at intervals of the pilot period $T_p$ fed from the control block 31, with regard to each of a plurality of offset amounts (offsets) ranging from the minimum value (MIN) to the maximum value (MAX) supplied from the control block 31, starting from the location determined by shift from the first subcarrier of P2 by the offset amount (offset) in effect. The subcarrier correlation thus computed is sent to the maximum value detection block 34.

The maximum value detection block 34 detects the largest of the sums of the power values which come from the sum computation block 33 and which have been obtained with regard to each of the multiple offset amounts (offsets). The maximum value detection block 34 then detects the offset amount (offset) corresponding to the largest sum of the power values as the P2 carrier shift amount, and sends the detected P2 carrier shift amount to the offset correction block 15 (FIG. 3).

Figure 8:
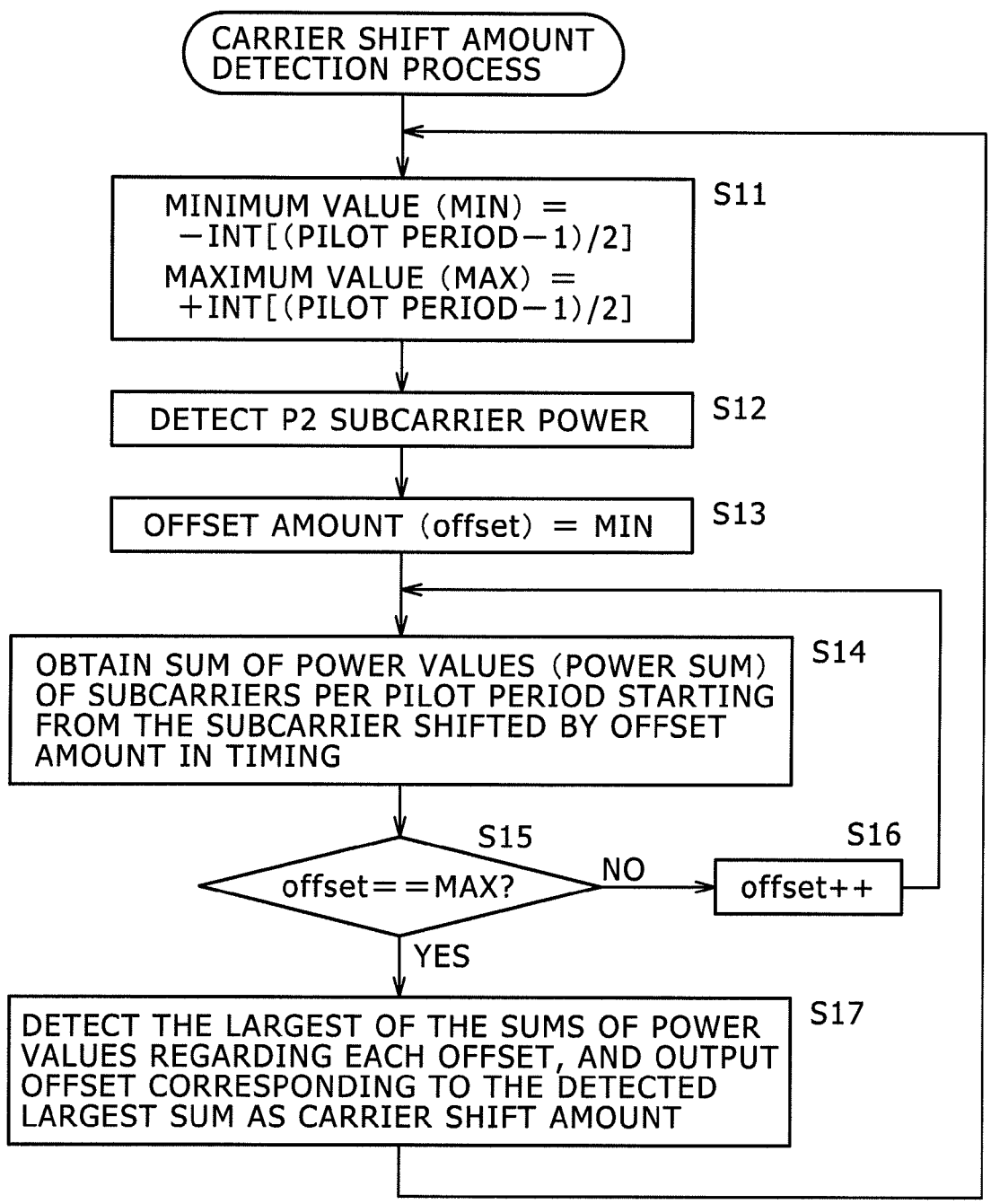
FIG. 8 is a flowchart explanatory of a carrier shift amount detection process for detecting the carrier shift amount using the first estimation method.

FIG. 8 is a flowchart explanatory of a carrier shift amount detection process performed by the preamble processing block 19 shown in FIG. 7.

Based on the symbol type fed from the symbol type estimation block 18 (FIG. 3), the control block 31 recognizes the supply timing at which the offset correction block 13 (FIG. 3) supplies the preamble processing block 19 with P2 included in the OFDM frequency domain signal.

When the supply timing is reached, i.e., when the OFDM frequency domain signal fed from the offset correction block 13 (FIG. 3) to the power detection block 32 becomes P2, the control block 31 in step S11 recognizes the FFT size and transmission mode (SISO or MISO) of P2 based on S1 and S2 coming from the preamble processing block 16 (FIG. 3). Also, the control block 31 recognizes the pilot period $T_p$ of the pilot signals in P2 on the basis of the recognized FFT size of P2 and transmission mode of P2, and sends the pilot period $T_p$ thus recognized to the sum computation block 33.

Furthermore, the control block 31 obtains the minimum value (MIN) and maximum value (MAX) of the offset amount (offset) using the pilot period $T_p$ and in keeping with the expressions MIN=−INT$[(T_p-1)/2]$ and MAX=+INT $[(T_p-1)/2]$, and feeds the maximum value MAX and minimum value MIN thus acquired to the sum computation block 33. From step S11, control is passed on to step S12.

In step S12, the power detection block 32 detects the power of each subcarrier in P2 supplied from the offset correction block 13 (FIG. 3), and sends the detected power value to the sum computation block 33. Control is then passed on to step S13.

In step S13, the sum computation block 33 sets the offset amount (offset) to the minimum value (MIN) coming from the control block 31. From step S13, control is passed on to step S14.

In step S14, with regard to the offset amount (offset) of interest, the sum computation block 33 computes the sum of the power values of the subcarriers at intervals of the pilot period $T_p$ coming from the control block 31, starting from the location determined by shift from the first subcarrier of P2 by the offset amount (offset), the power value of each subcarrier in P2 being supplied from the power detection block 32.

The sum computation block 33 proceeds to supply the maximum value detection block 34 with the sum of the power values computed with regard to the offset amount (offset) in effect. From step S14, control is passed on to step S15.

In step S15, the sum computation block 33 checks to determine whether the offset amount (offset) is equal to the maximum value (MAX).

If in step S15 the offset amount (offset) is not found equal to the maximum value (MAX), i.e., if the offset amount (offset) is smaller than the maximum value (MAX), then control is passed on to step S16. In step S16, the sum computation block 33 increments the offset amount (offset) by 1. From step S16, control is returned to step S14 and the subsequent steps are repeated.

If in step S15 the offset amount (offset) is found equal to the maximum value (MAX), i.e., if the sums of the power values regarding the offset amounts (offset) ranging from the minimum value (MIN) to the maximum value (MAX) have been computed, then control is passed on to step S17. In step S17, the maximum value detection block 34 detects as the subcarrier correlation the largest of the sums of the power values with regard to each of the offset amounts (offsets) ranging from the minimum value (MIN) to the maximum value (MAX).

Also, the maximum value detection block 34 detects the offset amount (offset) corresponding to the largest of the sums of the power values (maximum value of the subcarrier correlation) as the P2 carrier shift amount. The P2 carrier shift amount thus detected is sent to the offset correction block 15 (FIG. 3).

Thereafter, the control block 31 waits for the next P2, which is included in the OFDM frequency domain signal, to be supplied from the offset correction block 13 (FIG. 3) to the preamble processing block 19. When the next P2 is supplied, control is returned from step S17 to step S11 and the subsequent steps are repeated.

As described, the estimation method above involves detecting the largest of the sums of the power values with regard to each of the offset amounts (offsets) ranging from the minimum value (MIN) to the maximum value (MAX) as the P2 subcarrier correlation. This makes it possible to rapidly estimate the carrier shift amount with required accuracy, i.e., the "coarse" carrier shift amount with respect to the FFT size of P2.

For purpose of simplification and illustration, FIG. 8 shows the offset amount (offset) to be changed successively from the minimum value (MIN) to the maximum value (MAX) when the sum of the power values of the subcarriers at intervals of the pilot period $T_p$ is being computed. In practice, however, the sum of the power values of the subcarriers at intervals of the pilot period $T_p$ may be computed parallelly with regard to each of the offset amounts (offsets) ranging from the minimum value (MIN) to the maximum value (MAX).

Also in FIG. 8, it is assumed that only one P2 is included in the T2 frame and that the sum of the power values of the subcarriers at intervals of the pilot period $T_p$ is computed from one P2 as the subcarrier correlation with regard to the offset amount (offset) in effect. Alternatively, if the T2 frame contains a plurality of P2's, then the sum of the power values from each of the multiple P2's may be computed. The cumulative total or leaky integral of the sums of the power values from the multiple P2's may then be acquired, and the result may be adopted as the subcarrier correlation.

Specifically, for purpose of simplification and illustration, suppose that the T2 frame contains two P2's called the first P2 and the second P2. In that case, the cumulative total or leaky integral of the sums of the power values from the first P2 and the second P2 may be computed with regard to a given offset amount (offset), and the result may then be adopted as the subcarrier correlation with respect to the offset amount in effect.

Suppose now that x(m) denotes m-th data subject to leaky integration and that y(m) represents the integration value obtained by performing the leaky integration of data ranging from x(1) to x(m). In this case, the integration value y(m) is acquired using the expression $y(m)=\beta x(m)+(1-\beta)y(m-1)$.

In the foregoing paragraphs, the subcarrier correlation was shown to be computed using all subcarriers included in P2 at intervals of the pilot period $T_p$. Alternatively, some of the subcarriers included in P2 at intervals of the pilot period $T_p$ may be thinned out before the subcarriers are submitted to the subcarrier correlation computation.

Meanwhile, according to the first estimation method, the minimum value (MIN) and maximum value (MAX) of the offset amount (offset) are obtained using the expressions MIN=−INT[($T_p$−1)/2] and MAX=+INT[($T_p$−1)/2], respectively.

With the first estimation method, it is impossible to detect any carrier shift amount outside the range from the minimum (MIN) to the maximum (MAX).

Under DVB-T2, the pilot period $T_p$ is either 6 or 3 as mentioned above. It follows that the minimum value (MIN) and maximum value (MAX) are either −2 and +2, or −1 and +1.

Illustratively, consider an example in which the pilot period $T_p$ is 6 and the minimum value (MIN) and maximum value (MAX) are −2 and +2 respectively. In this case, if the carrier shift amount of a P2 is, say, −3 outside the range from the minimum (MIN) to the maximum (MAX), then it is impossible to distinguish two possibilities using the first estimation method: the carrier shift amount of the P2 in question may be either −3, or +3 (=−3+i×$T_p$; "i" is an integer).

In another example, if the carrier shift amount of a P2 is −4 outside the range from the minimum value (MIN) to the maximum value (MAX), then it is also impossible to distinguish two possibilities using the first estimation method: the carrier shift amount of the P2 in question may be either −4, or +2 (=−4+i×$T_p$).

As described above, in cases where the P2 carrier shift amount is outside the range from the minimum value (MIN) to the maximum value (MAX), i.e., where the carrier shift amount is smaller than −INT[($T_p$−1)/2] or larger than +INT[($T_p$−1)/2], it is impossible precisely to detect the carrier shift amount using the first estimation method.

However, where the accuracy of estimating the "coarse" carrier shift amount using P1 has deteriorated, the carrier shift amount may well become smaller than −INT[($T_p$−1)/2] or larger than +INT[($T_p$−1)/2]. In such cases, it is preferable precisely to detect the carrier shift amount.

[Second Method for Estimating the Carrier Shift Amount]

What follows is a description of the second estimation method for estimating the carrier shift amount using the subcarrier correlation computed through the use of subcarrier phases.

FIGS. 9A, 9B, 9C and 9D are schematic views explanatory of the second estimation method for estimating the carrier shift amount.

Figure 9A:
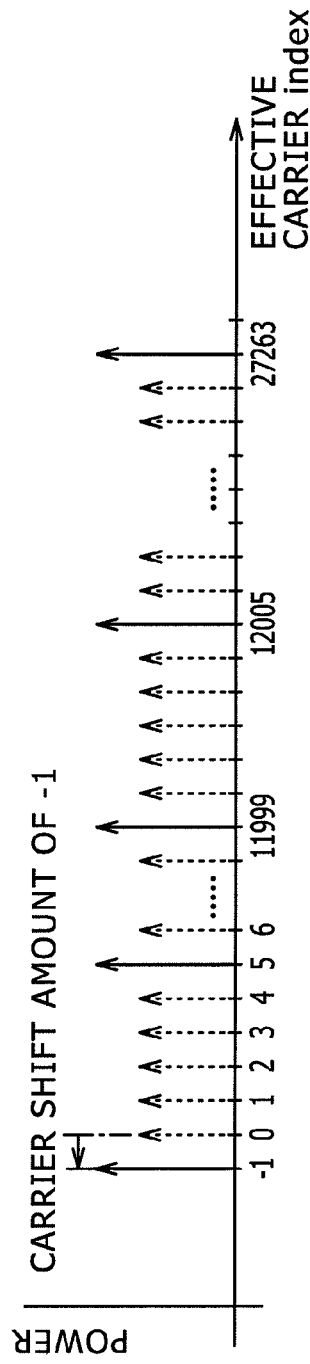
FIGS. 9A, 9B, 9C and 9D are schematic views explanatory of a second estimation method for estimating the carrier shift amount.

FIG. 9A indicates power values of a P2 (from the OFDM frequency domain signal).

In FIG. 9A, the horizontal axis and the vertical axis are the same as those in FIG. 4.

As with the P2 shown in FIGS. 5A and 5B, the P2 in FIG. 9A has its FFT size set to 32 K and is in SISO mode, so that the pilot period is 6. The carrier shift amount of the P2 in FIG. 9A is −1.

The pilot signals of the P2 are those obtained by modulating PRBS's (Pseudorandom Binary Sequences) by BPSK (Binary Phase Shift Keying).

That is, the pilot signals of the P2 are those acquired by BPSK-modulating the exclusive-OR between PRBS's in the direction of subcarriers (direction of frequencies) and PN (Pseudo Noise) sequences in the direction of OFDM symbols (direction of time).

As a result, on a two-dimensional plane defined by the x-axis (horizontal axis extending from left to right) representing the direction of frequencies and by the y-axis (vertical axis extending from to bottom) denoting the direction of time, the phase of the symbol of the pilot signal with a frequency "x" at a time "y" of P2, i.e., the phase of the pilot signal (its subcarrier) in a location (x, y), is either 0 or π[radian] depending on the exclusive-OR between the x-th bit from the left of the PRBS's in the direction of frequencies and the y-bit from the top of the PN sequences in the direction of time.

The above-described pilot signal of P2 is multiplied by the PRBS. That is, when rotated by 0 or by π in phase depending on the PRBS, the pilot signal becomes a symbol with its phase at 0 or π in an IQ constellation.

Thus each subcarrier in P2 is mapped to a location on the circumference of, say, a unit circle centering on the origin of the IQ constellation, the location being determined by rotation by the phase of the P2 subcarrier multiplied by the modulation signal obtained by BPSK-modulating the PRBS. Obtained next is a phase vector of which the starting point is the origin of the constellation and of which the endpoint is the mapping point to which the subcarrier has been mapped. With regard to each of a plurality of offset amounts (offsets) ranging from the minimum value (MIN) to the maximum value (MAX), the subcarrier correlation is computed in the form of the sum of the phase vectors of the subcarriers at intervals of the pilot period starting from the location determined by shift from the first subcarrier of P2 by the offset amount (offset) in effect. The sum of the phase vectors acquired as the subcarrier correlation is then used to detect the P2 carrier shift amount.

Figure 9B:
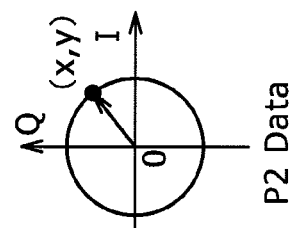

FIG. 9B shows a mapping point of a P2 pilot signal (its subcarrier) in the IQ constellation.

With regard to a single P2 (one OFDM symbol of P2), the subcarrier constituting a pilot signal is multiplied by the modulation signal obtained by BPSK-modulating the PRBS. The multiplied subcarrier has its phase set to 0 (or π), so that the mapping point (I, Q) in the IQ constellation is a point (1, 0) (or (−1, 0)).

When the subcarrier at the location reached by shift from the first subcarrier of P2 by the offset amount (offset) is a pilot signal, that location is regarded as the starting point. Since the subcarriers at intervals of the pilot period $T_p$ from the starting point on are all pilot signals, the subcarrier correlation represented by the sum of the phase vectors of these subcarriers at intervals of the pilot period $T_p$ tends to be large.

Figure 9C:
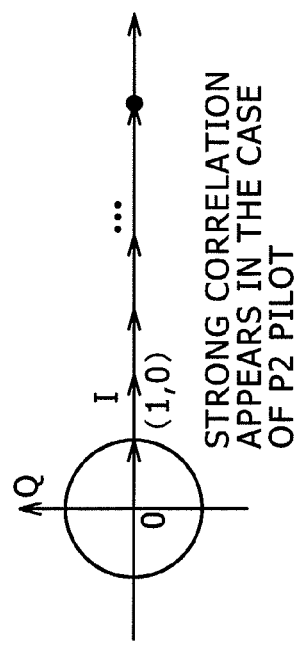

FIG. 9C shows the sum of the phase vectors of the subcarriers at intervals of the pilot period from a starting point onward; the starting point is represented by the subcarrier at the location reached by shift from the first subcarrier of P2 by the offset amount (offset).

As discussed above, when the subcarrier at the location reached by shift from the first subcarrier of P2 by the offset amount (offset) is a pilot signal, the subcarriers at intervals of the pilot period starting from that shifted location are all pilot signals.

As a result, the mapping point of every subcarrier at intervals of the pilot period is (ideally) a point (1, 0) and its phase vector is a vector (1, 0). The sum of the phase vectors of the subcarriers at intervals of the pilot period constitutes a vector of a large magnitude because the vectors (1, 0) are added up cumulatively.

On the other hand, if the subcarrier at the location reached by shift from the first subcarrier of P2 by the offset amount (offset) is not a pilot signal but data, then the sum of the phase vectors of the subcarriers at intervals of the pilot period constitutes a subcarrier correlation of a small magnitude.

Figure 9D:
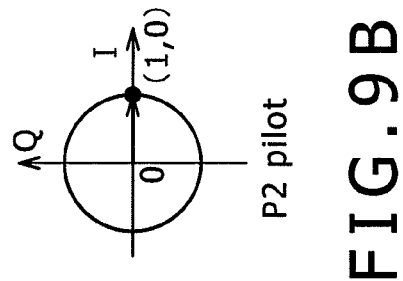

FIG. 9D shows a mapping point of a P2 data subcarrier in the IQ constellation.

The subcarrier phase of data varies depending on the data, and the mapping point varies in like manner.

If the subcarrier at the location reached by shift from the first subcarrier of P2 by the offset amount (offset) is not a pilot signal but data, then the subcarriers at intervals of the pilot signal starting from that shifted location are all data subcarriers and not pilot signals. The phase vectors of these subcarriers at intervals of the pilot period are thus oriented in diverse directions, each vector having the magnitude of 1.

As a result, where the subcarrier at the location reached by shift from the first subcarrier of P2 by the offset amount (offset) is a data subcarrier, the sum of the phase vectors of the subcarriers at intervals of the pilot period constitutes a subcarrier correlation of a vector having a small magnitude (e.g., 0).

The second estimation method thus involves detecting the largest of the sum vectors summing up the phase vectors obtained with regard to each of a plurality of offset amounts (offsets) ranging from the minimum value (MIN) to the maximum value (MAX). The offset amounts (offsets) corresponding to the largest sum vector is then detected as the P2 carrier shift amount.

Incidentally, the multiplication of the P2 subcarrier by the modulation signal acquired by BPSK-modulating the PRBS (i.e., the phase of the P2 subcarrier is rotated in keeping with the PRBS) is called PRBS decoding.

According to the second estimation method (as with a third estimation method, to be discussed later), the subcarriers of P2 are PRBS-decoded, and the sum of the phase vectors of the PRBS-decoded subcarriers at intervals of the pilot period is obtained. This makes it possible precisely to detect a carrier shift amount smaller than $-INT[(T_p-1)/2]$ or a carrier shift amount larger than $+INT[(T_p-1)/2]$ (called the carrier shift amount larger than the pilot period $T_p$ hereunder where appropriate).

Illustratively, consider the P2 which is shown in FIG. 9A, of which the pilot period $T_p$ is 6, and of which the carrier shift amount is −1. The carrier shift amounts of −16 and +16 larger than the pilot period $T_p$ are assumed to be adopted as the minimum (MIN) and maximum (MAX) values of the offset amount (offset), respectively.

In that case, with regard to the offset amount (offset) of −16, the subcarriers at intervals of the pilot period $T_p$ starting from the location determined by shift by the offset amount (offset) in effect are not pilot signals but data subcarriers. The sum vector summing up the phase vectors of these subcarriers at intervals of the pilot period $T_p$ is then a vector of a small magnitude, e.g., 0.

Likewise, with regard to the offset amount (offset) of −15 or −14, the subcarriers at intervals of the pilot period $T_p$ starting from the location determined by shift by the offset amount (offset) in effect are data subcarriers. The sum vector summing up the phase vectors of these subcarriers at intervals of the pilot period $T_p$ is also a vector of a small magnitude.

With respect to the offset amount (offset) of −13, the subcarriers at intervals of the pilot period $T_p$ starting from the location determined by shift by the offset amount (offset) in question are pilot signals. However, the offset amount of −13 does not coincide with the carrier shift amount of −1. For this reason, the mapping points of the pilot signals on the IQ constellation as the PRBS-decoded subcarriers at intervals of the pilot period $T_p$ are randomly dispersed to points (1, 0) and (−1, 0).

As a result, the sum vector summing up the phase vectors of the subcarriers at intervals of the pilot period $T_p$ constitutes a vector of a small magnitude.

The offset amounts (offsets) ranging from the minimum value (MIN) of −16 to the maximum value (MAX) of +16 include an offset amounts (offsets) not coinciding with the value obtained by adding an integer multiple of the pilot period $T_p$ to the carrier offset amount of −1. With respect to that unmatched offset amount, as with the above-mentioned case where the offset amount (offset) is −16, the subcarriers at intervals of the pilot period starting from the location determined by shift by the offset amounts (offsets) in question are data subcarriers. In this case, the sum vector summing up the phase vectors of these subcarriers at intervals of the pilot period $T_p$ constitutes a vector of a small magnitude, e.g., 0.

The offset amounts (offsets) ranging from the minimum value (MIN) of −16 to the maximum value (MAX) of +16 also include an offset amounts (offsets) coinciding with the value obtained by adding an integer multiple (except for 0) of the pilot period $T_p$ to the carrier shift amount of −1. With respect to that coinciding offset amounts (offsets), as with the above-mentioned case where the offset amount (offset) is −13, the subcarriers at intervals of the pilot period $T_p$ starting from the location determined by shift by the offset amounts (offsets) in question are pilot signals. Since the offset amount (offset) does not coincide with the carrier shift amount of −1, the mapping points on the IQ constellation of the pilot signals constituted by the subcarriers of the PRBS-decoded subcarriers at intervals of the pilot period $T_p$ are randomly dispersed to points (1, 0) and (−1, 0). In this case, the sum vector summing up the phase vectors of the subcarriers at intervals of the pilot period $T_p$ also makes up a vector of a small magnitude.

The offset amounts (offsets) ranging from the minimum value (MIN) of −16 to the maximum value (MAX) of +16 also include an offset amounts (offsets) coinciding with the carrier shift amount of −1. With respect to that coinciding offset amounts (offsets), the subcarriers at intervals of the pilot period $T_p$ starting from the location determined by shift by the offset amounts (offsets) in question are pilot signals. The mapping points on the IQ constellation of the pilot signals constituted by the subcarriers of the PRBS-decoded subcarriers at intervals of the pilot period $T_p$ then concentrate on the point (1, 0) or (−1, 0).

As a result, the sum vector summing up the phase vectors of the subcarriers at intervals of the pilot period $T_p$ constitutes a vector of a large magnitude as shown in FIG. 9C.

According to the second estimation method (as with the third estimation method to be discussed later), as described above, the subcarriers of P2 are PRBS-decoded. Of these PRBS-decoded subcarriers, those at intervals of the pilot period $T_p$ have their phase vectors summed up to provide a sum vector. If the offset amount (offset) does not coincide with the carrier shift amount, then the sum vector is a vector of a small magnitude even where the subcarriers at intervals of the pilot period $T_p$ are pilot signals.

As a result, even when there is a carrier offset amount larger than the pilot period $T_p$, it is possible precisely to detect such a carrier offset amount.

Alternatively, with the second estimation method in use, the subcarriers of P2 may be mapped without getting PRBS-decoded. The phase vector of each subcarrier is then computed, each vector starting at the origin and ending at the endpoint determined by the I-component (in absolute value or square) of the mapping point in question and by the Q-component of the mapping point. The phase vectors are summed up to provide the sum vector that can be used to detect the carrier shift amount.

In the preceding case, the P2 carrier shift amount that can be detected accurately is larger than $-INT[(T_p-1)/2]$ and smaller than $+INT[(T_p-1)/2]$, as with the case where the first estimation method is adopted.

As discussed above, of the PRBS-decoded subcarriers, those at intervals of the pilot period $T_p$ have their phase vectors summed up to provide the sum vector. This sum vector is a vector of a small magnitude unless the offset amount (offset) does not coincide with the carrier offset amount. That means the minimum value (MIN) and maximum value (MAX) of the offset amount (offset) may be established in a manner determining a desired range in which to detect the carrier shift amount.

It should be noted that if the range in which to detect the carrier offset amount is set to be extensive, the number of offset amounts (offsets) for which the sum vectors are to be obtained can become appreciably large. Illustratively, if the sum vectors are to be acquired in parallel by hardware, the scale of the hardware may be huge.

For that reason, it is preferable to establish a necessary and sufficient range in which to detect the carrier offset amount, i.e., a necessary and sufficient range from an appropriate minimum value (MIN) to a suitable maximum value (MAX) of offset amounts (offsets).

It is assumed here that $D_1$ stands for the subcarrier spacing D of P1 (FIG. 1) that uses only the widest of the subcarrier spacings stipulated by DVB-T2 and that $D_2$ denotes the subcarrier spacing D of P2. On that assumption, the second estimation method is utilized for obtaining the minimum value (MIN) and maximum value (MAX) of the offset amount (offset) using the quotient of the division of the subcarrier spacing $D_1$ of P1 by the subcarrier spacing $D_2$ of P2.

Figure 10:
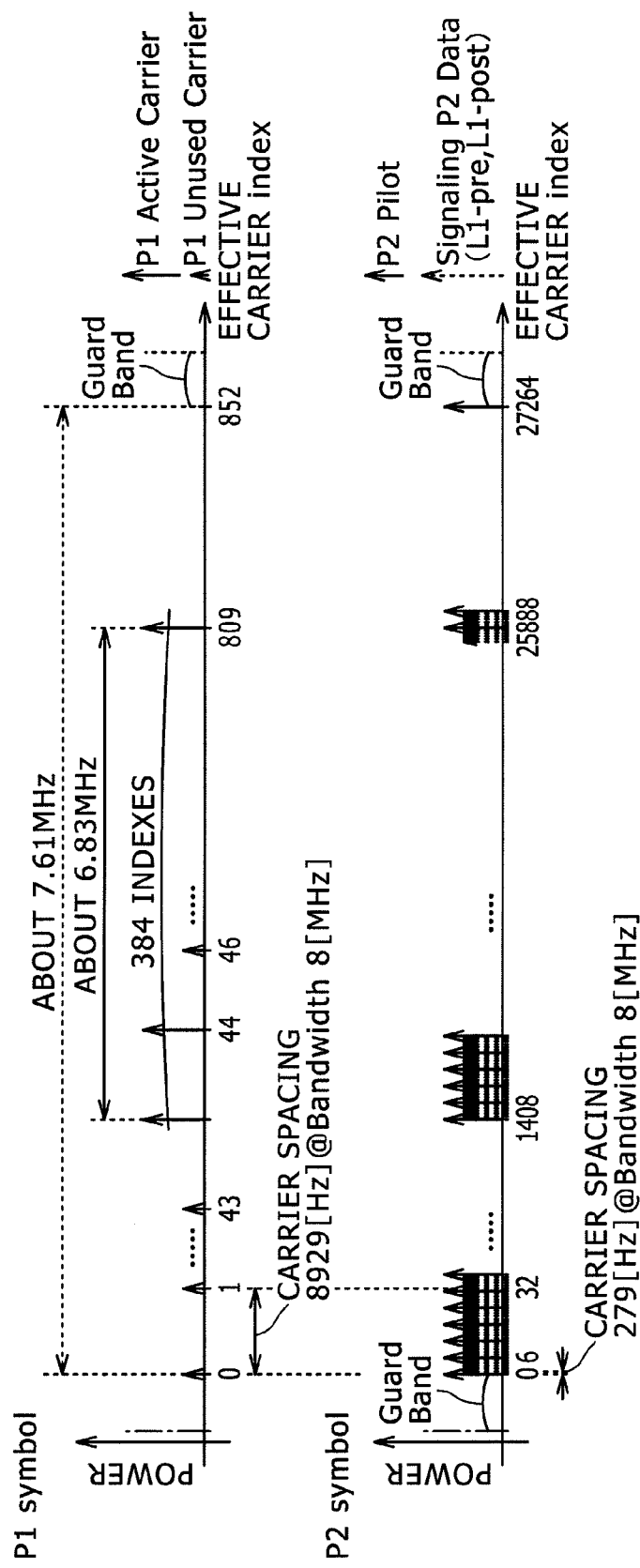
FIG. 10 is a schematic view showing power values of P1 and P2.

FIG. 10 schematically shows power values of P1 and P2 in effect when the transmission bandwidth is 8 MHz.

Figure 2:
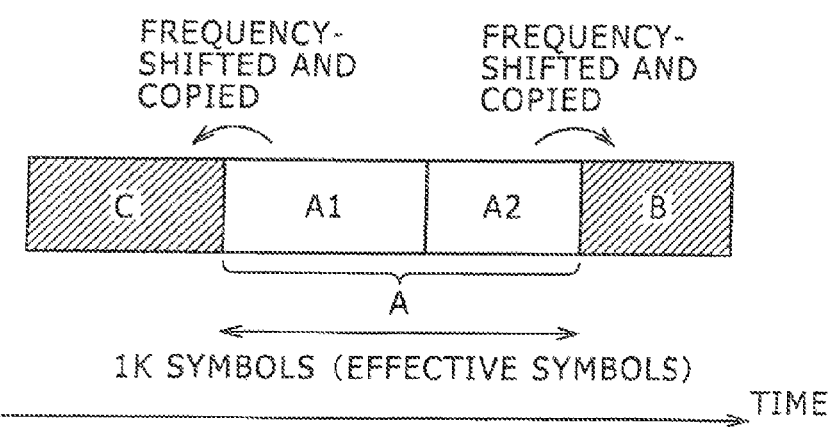
FIG. 2 is a schematic view showing the OFDM signal of P1.

The subcarrier spacing $D_1$ of P1 is 8,929 Hz as explained above in reference to FIG. 2.

The P2 in FIG. 10 has its FFT size set to 32 K, is in SISO mode, and possesses the subcarrier spacing $D_2$ of 279 Hz as discussed above in reference to FIG. 2.

In the preamble processing block 19 (FIG. 3), the OFDM frequency domain signal including P2 used to detect the P2 carrier shift amount is an OFDM signal having undergone the correction by the offset correction block 13 of the P1 carrier shift amount detected by use of P1. The carrier shift amount falls within the range of ±0.5×subcarrier spacing D1, i.e., within the range of ±8,929/2 Hz (between −8,929/2 Hz and +8,929 Hz).

Therefore, a sufficient range in which to detect the carrier shift amount is determined as ±0.5×subcarrier spacing $D_1$. The range of ±0.5×subcarrier spacing $D_1$ turns out to be ±0.5×$D_1$/$D_2$ when converted to the offset amount (offset) for the $P_2$ of which the subcarrier spacing D is $D_2$.

From the foregoing description, it can be seen that for the P2 of which the subcarrier spacing $D_2$ is 279 Hz, it is sufficient to detect the carrier shift amount within the range of ±0.5×8, 929 Hz/279 Hz, i.e., within the range of ±16. In this case, the minimum value (MIN) and maximum value (MAX) of the offset amount (offset) are −16 and +16, respectively.

[Preamble Processing Block 19 Detecting the Carrier Shift Amount Using the Second Estimation Method]

Figure 11:
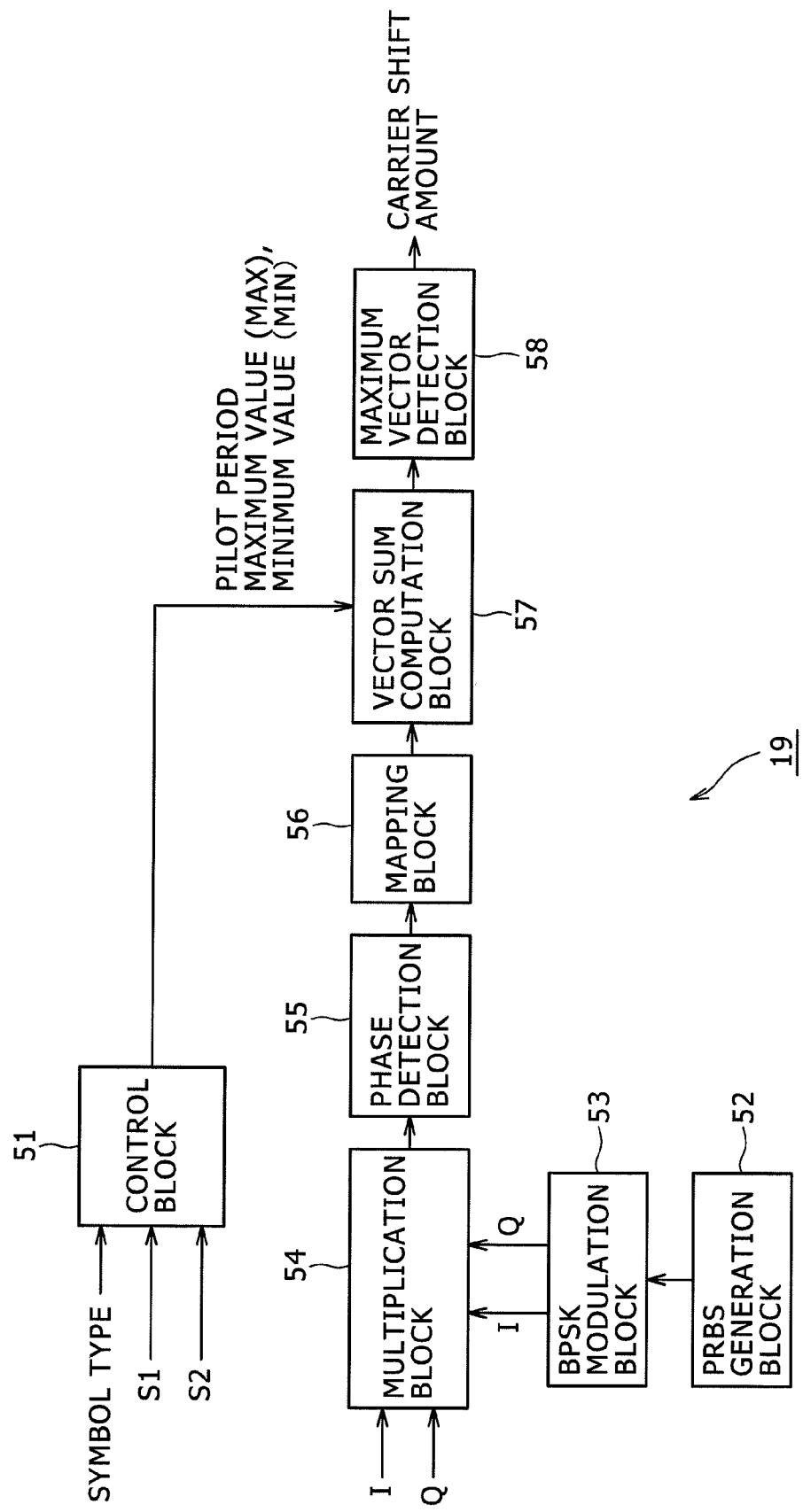
FIG. 11 is a block diagram showing a typical structure of a preamble processing block for detecting the carrier shift amount using the second estimation method.

FIG. 11 is a block diagram showing a typical structure of the preamble processing block 19 (FIG. 3) for detecting the carrier shift amount using the second estimation method.

In FIG. 11, the preamble processing block 19 includes a control block 51, a PRBS generation block 52, a BPSK modulation block 53, a multiplication block 54, a phase detection block 55, a mapping block 56, a vector sum computation block 57, and a maximum vector detection block 58.

The control block 51 is fed with the symbol type from the symbol type estimation block 18 (FIG. 3) and with S1 and S2 from the preamble processing block 16.

Based on the symbol type coming from the symbol type estimation block 18, the control block 51 recognizes the supply timing at which the offset correction block 13 (FIG. 3) supplies the preamble processing block 19 with P2 included in the OFDM frequency domain signal.

The control block 51 then controls the blocks (ranging from the PRBS generation block 52 to the maximum vector detection block 58) constituting the preamble processing block 19 so as to process the OFDM frequency domain signal, i.e., P2, supplied at the supply timing.

The control block 51 also recognizes the FFT size and transmission mode (SISO or MISO) of P2 based on S1 and S2 coming from the preamble processing block 16 (FIG. 3).

Further, the control block 51 recognizes the pilot period $T_p$ of the pilot signals in P2 on the basis of the FFT size of P2 and transmission mode of P2. The pilot period $T_p$ thus recognized is sent to the vector sum computation block 57.

Also, the control block 51 obtains the subcarrier spacing $D_2$ of P2 from the FFT size of P2 and other data. Using the quotient $D_1/D_2$ of the division of the subcarrier spacing $D_1$ of P1 by the subcarrier spacing $D_2$ of P2, the control block 51 acquires the minimum value (MIN) and maximum value (MAX) of the offset amount (offset). The minimum (MIN) and maximum (MAX) values thus obtained are fed to the vector sum computation block 57.

More specifically, the control block 51 obtains the minimum value (MIN) in accordance with the expression MIN=−INT[$(D_1/D_2)/2$], and the maximum value (MAX) in keeping with the expression MAX=+INT[$(D_1/D_2)/2$].

The PRBS generation block 52 generates the same PRBS's as those used by a transmission apparatus not shown generating the pilot signals of P2 while transmitting the OFDM signal. The PRBS's thus generated are supplied to the BPSK modulation block 53.

The BPSK modulation block 53 BPSK-modulates the bits in the PRBS coming from the PRBS generation block 52 into symbols in an IQ constellation constituting a modulated signal. The symbols in the IQ constellation are then fed to the multiplication block 54.

In addition to the modulated signal fed from the BPSK modulation block 53, the multiplication block 54 is supplied with the OFDM frequency domain signal from the offset correction block 13 (FIG. 3).

The multiplication block 54 performs a PRBS decoding process involving multiplication, by the modulated signal from the BPSK modulation block 53, of each of the subcarriers belonging to one OFDM symbol of P2 included in the OFDM frequency domain signal coming from the offset correction block 13. The subcarriers having undergone the PRBS decoding process are sent to the phase detection block 55.

The phase detection block 55 detects the phase of each of the PRBS-decoded subcarriers from the multiplication block 54, and sends the detected phases to the mapping block 56.

Here, the phase detection block 55 detects the phase of each PRBS-decoded subcarrier illustratively on the assumption that the phase of the pilot signal (located on the subcarrier in question) having the lowest frequency in P2 is 0. Although the pilot signal with the lowest frequency in P2 is called the edge pilot signal under DVB-T2, this signal can be treated as a P2 pilot signal (P2 pilot) with no problem.

The mapping block 56 maps each subcarrier to a location on the circumference of, say, a unit circle centering on the origin of the IQ constellation, the location being determined by rotation by the subcarrier phase in question coming from the phase detection block 55. The mapping block 56 proceeds to obtain a phase vector starting at the origin and ending at the mapping point to which the subcarrier has been mapped (alternatively, the phase vector may start at the mapping point and end at the origin). The mapping block 56 supplies the vector sum computation block 57 with the phase vector thus acquired regarding each of the subcarriers in P2.

With regard to each of a plurality of offset amounts (offsets) ranging from the minimum (MIN) to maximum (MAX) values (=MIN, MIN+1, . . . MAX−1, MAX) fed from the control block 51, the vector sum computation block 57 uses the phase vectors of the subcarriers in one OFDM symbol of P2 sent from the mapping block 56 in order to compute as the subcarrier correlation the sum vector summing up the phase vectors of the subcarriers at intervals of the pilot period $T_p$ starting from the location determined by shift from the first subcarrier in P2 by the offset amount (offset). The subcarrier correlation thus computed is fed to the maximum vector detection block 58.

The maximum vector detection block 58 detects the largest (in magnitude) of the sum vectors which come from the vector sum computation block 57 and which are obtained with regard to each of a plurality of offset amounts (offsets). The maximum vector detection block 58 then detect the offset amount (offset) corresponding to the largest sum vector as the P2 carrier shift amount, and sends the detected P2 carrier shift amount to the offset correction block 15 (FIG. 3).

Figure 12:
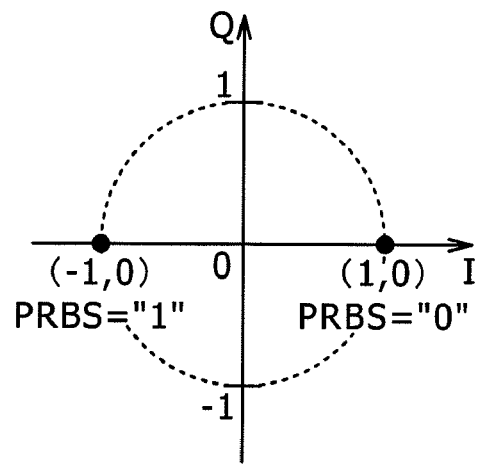
FIG. 12 is a schematic view explanatory of the processing performed by a BPSK modulation block.

FIG. 12 is a schematic view explanatory of the processing performed by the BPSK modulation block 53 shown in FIG. 11.

Specifically, FIG. 12 shows an IQ constellation.

As mentioned above, the BPSK modulation block 53 BPSK-modulates each of the bits in the PRBS coming from the PRBS generation block 52.

That is, if a given bit in the PRBS from the PRBS generation block 52 is 0, the BPSK modulation block 53 BPSK-modulates that bit into a modulated signal corresponding to the symbol of a constellation point (1, 0) in the IQ constellation. If a given bit in the PRBS from the PRBS generation block 52 is 1, then the BPSK modulation block 53 BPSK-modulates that bit into a modulated signal corresponding to the symbol of a constellation point (−1, 0) in the IQ constellation.

The BPSK modulation of the PRBS performed by the BPSK modulation block 53 is the same as the BPSK modulation of the PRBS as the pilot signal in P2 (i.e., for finding the exclusive-OR between the PRBS and the PN sequence), the latter modulation being carried out by the transmission apparatus transmitting the OFDM signal.

Figure 13:
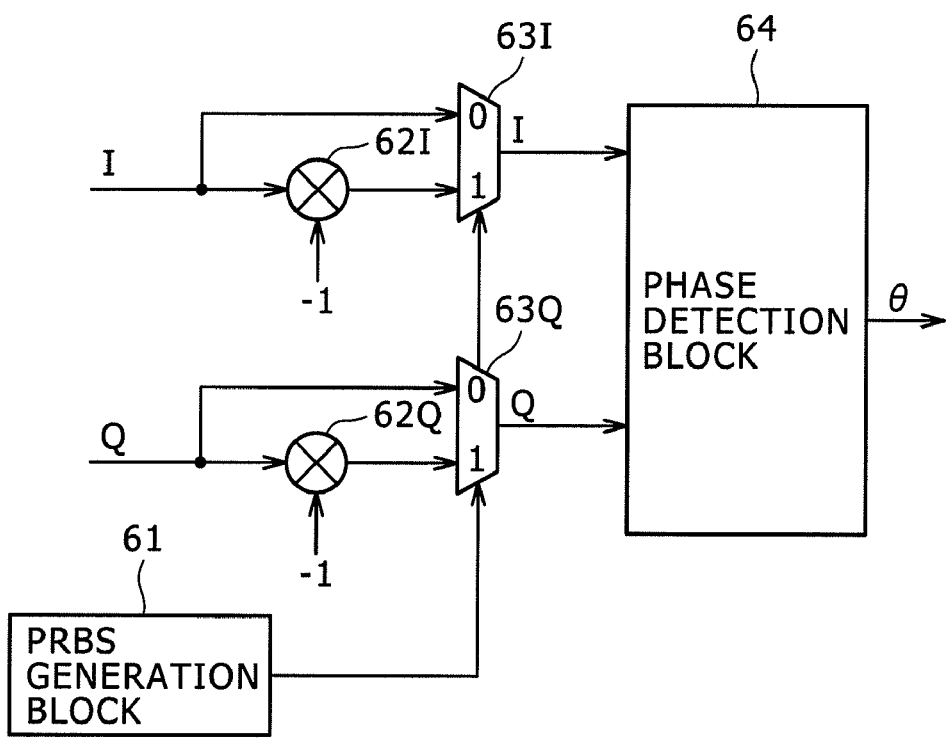
FIG. 13 is a block diagram showing a typical setup in which a PRBS generation block, the BPSK modulation block, a multiplication block, and a phase detection block are implemented.

FIG. 13 is a block diagram showing how the PRBS generation block 52, BPSK modulation block 53, multiplication block 54, and phase detection block 55 in FIG. 11 are illustratively implemented.

In FIG. 13, the PRBS generation block 52, BPSK modulation block 53, multiplication block 54, and phase detection block 55 in FIG. 11 are constituted by a PRBS generation block 61, multiplication blocks 62I and 62Q, selectors 63I and 63Q, and a phase detection block 64.

The PRBS generation block 61 generates the same PRBS as that generated by the PRBS generation block 52 in FIG. 11. The PRBS thus generated is fed to the selectors 63I and 63Q.

The multiplication block 62I is supplied with the I-component of the OFDM frequency domain signal (i.e., a P2 subcarrier (symbol) included in the signal) coming from the offset correction block 13 (FIG. 3).

The multiplication block 62I then multiplies by −1 the I-component of the OFDM frequency domain signal from the offset correction block 13. The product resulting from the multiplication is fed to the selector 63I.

The multiplication block 62Q is fed with the Q-component of the OFDM frequency domain signal (i.e., a P2 subcarrier (symbol) included in the signal) coming from the offset correction block 13 (FIG. 3).

The multiplication block 62Q then multiplies by −1 the Q-component of the OFDM frequency domain signal from the offset correction block 13. The product resulting from the multiplication is sent to the selector 63Q.

In addition to the product from the multiplication block 62I, the selector 63I is supplied with the I-component of the OFDM frequency domain signal from the offset correction block 13 (FIG. 3).

In keeping with the bit of the PRBS from the PRBS generation block 61, the selector 63I selects either the I-component of the OFDM frequency domain signal from the offset correction block 13 or the product from the multiplication block 62I. What was selected by the selector 63I is sent to the phase detection block 64 as the I-component of the subcarrier having undergone the PRBS decoding process.

If the bit of the PRBS from the PRBS generation block 61 is 0, the selector 63I selects the I-component of the OFDM frequency domain signal from the offset correction block 13. If the bit of the PRBS from the PRBS generation block 61 is 1, then the selector 63I selects the product from the multiplication block 62I.

In addition to the product from the multiplication block 62Q, the selector 63Q is supplied with the Q-component of the OFDM frequency domain signal from the offset correction block 13 (FIG. 3).

In keeping with the bit of the PRBS from the PRBS generation block 61, the selector 63Q selects either the Q-component of the OFDM frequency domain signal from the offset correction block 13 or the product from the multiplication block 62Q. What was selected by the selector 63Q is sent to the phase detection block 64 as the Q-component of the subcarrier having undergone the PRBS decoding process.

If the bit of the PRBS from the PRBS generation block 61 is 0, the selector 63Q selects the Q-component of the OFDM frequency domain signal from the offset correction block 13. If the bit of the PRBS from the PRBS generation block 61 is 1, then the selector 63Q selects the product from the multiplication block 62Q.

The phase detection block 64 acquires the phase of the subcarrier which is made up of the I-component from the selector 63I and the Q-component from the selector 63Q and which has undergone the PRBS decoding process. The subcarrier phase thus obtained is fed to the mapping block 56 (FIG. 11).

Figure 14:
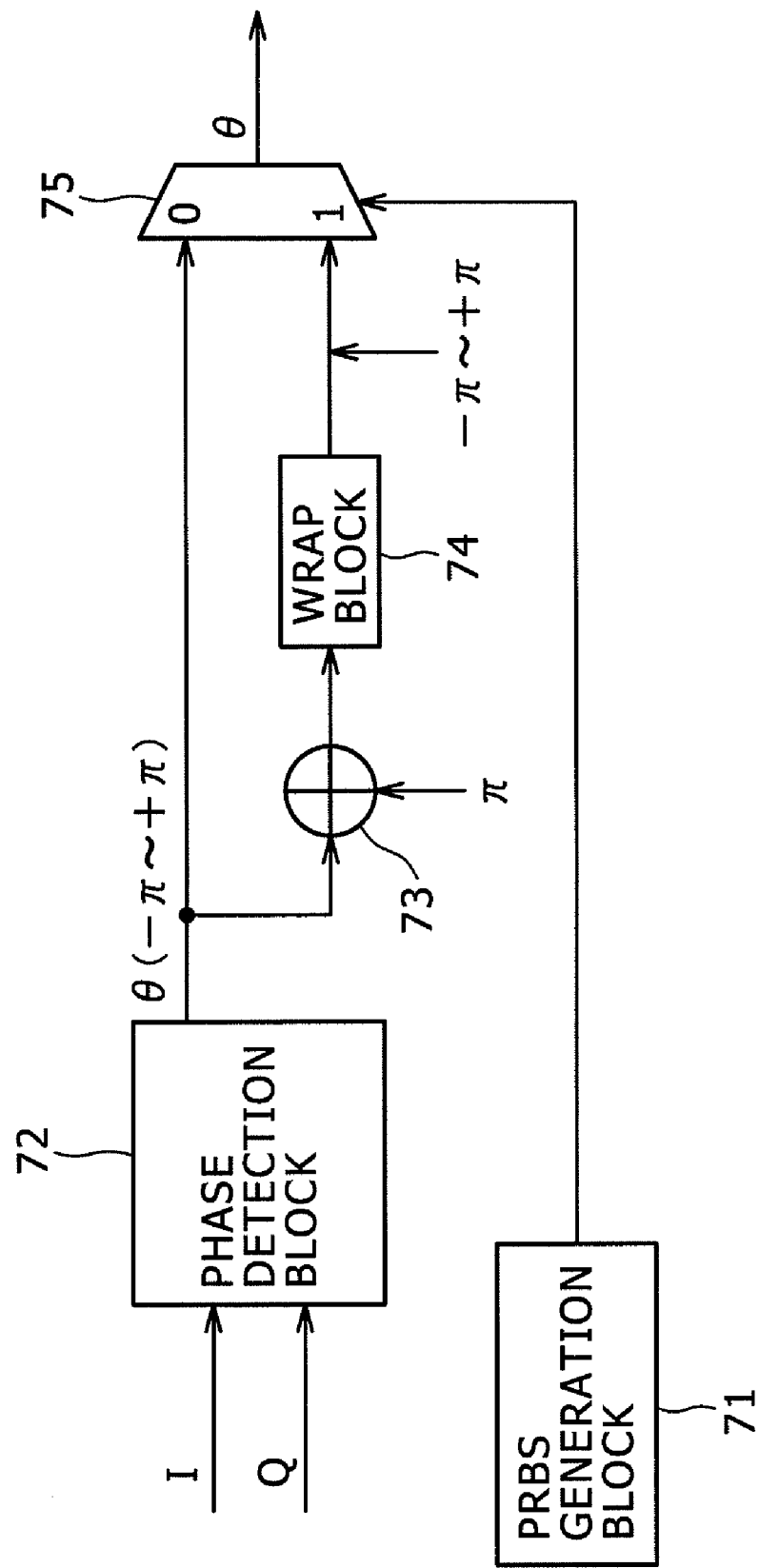
FIG. 14 is a block diagram showing another typical setup in which the PRBS generation block, BPSK modulation block, multiplication block, and phase detection block are implemented.

FIG. 14 is a block diagram showing how the PRBS generation block 52, BPSK modulation block 53, multiplication block 54, and phase detection block 55 indicated in FIG. 11 are implemented alternatively.

In FIG. 14, the PRBS generation block 52, BPSK modulation block 53, multiplication block 54, and phase detection block 55 in FIG. 11 are constituted by a PRBS generation block 71, a phase detection block 72, an addition block 73, a WRAP block 74, and a selector 75.

The PRBS generation block 71 generates the same PRBS as that generated by the PRBS generation block 52 in FIG. 11. The PRBS thus generated is fed to the selector 75.

The phase detection block 72 is fed with the OFDM frequency domain signal from the offset correction block 13 (FIG. 3).

The phase detection block 72 then detects the phase θ of a P2 subcarrier within the range from −π to +π, the subcarrier being included in the OFDM frequency domain signal from the offset correction block 13. The subcarrier phase thus detected is sent to the addition block 73 and selector 75.

The addition block 73 adds π to the phase θ supplied from the phase detection block 72. The phase θ+π resulting from the addition is fed to the WRAP block 74.

The WRAP block 74 adds an integer multiple of 2π to the phase θ+π from the addition block 73, thereby converting the phase θ+π into a phase defined within the range from −π to +π. The resulting phase is fed to the selector 75.

In keeping with the bit of the PRBS from the PRBS generation block 71, the selector 75 selects either the phase from the phase detection block 72 or the phase from the WRAP block 74. What was selected by the selector 75 is sent to the mapping block 56 (FIG. 11) as the phase of the subcarrier having undergone the PRBS decoding process.

If the bit of the PRBS from the PRBS generation block 71 is 0, the selector 75 selects the phase fed from the phase detection block 72. If the bit of the PRBS from the PRBS generation block 71 is 1, then the selector 75 selects the phase from the WRAP block 74.

Figure 15:
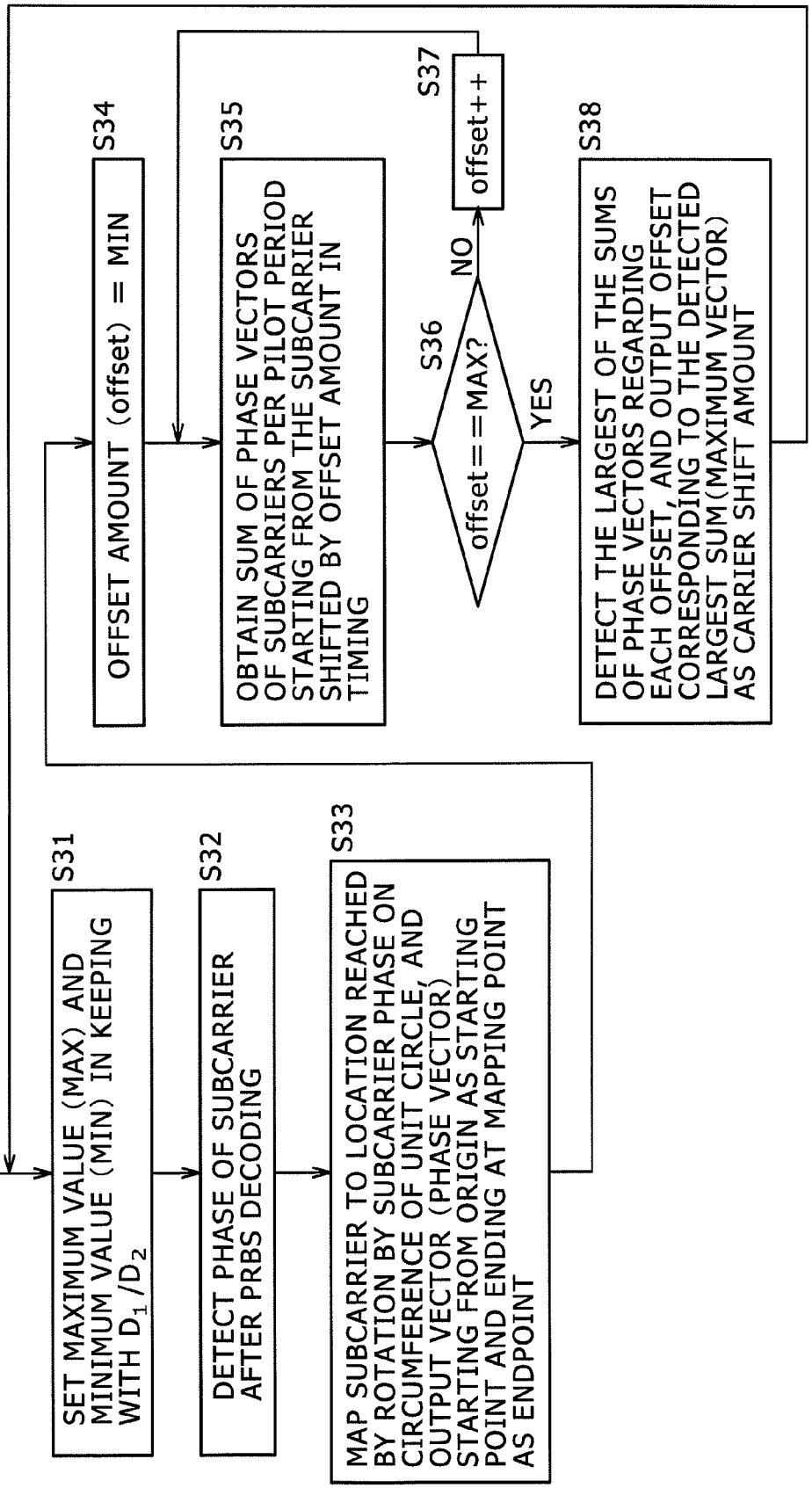
FIG. 15 is a flowchart explanatory of a carrier shift amount detection process for detecting the carrier shift amount using the second estimation method.

FIG. 15 is a flowchart explanatory of the carrier shift amount detection process performed by the preamble processing block 19 shown in FIG. 11.

Based on the symbol type fed from the symbol type estimation block 18 (FIG. 3), the control block 51 recognizes the supply timing at which the offset correction block 13 (FIG. 3) supplies the preamble processing block 19 with P2 included in the OFDM frequency domain signal.

When the supply timing is reached, i.e., when the OFDM frequency domain signal fed from the offset correction block 13 (FIG. 3) to the multiplication block 54 becomes P2, the control block 51 in step S31 recognizes the FFT size and transmission mode (SISO or MISO) of P2 based on S1 and S2 coming from the preamble processing block 16 (FIG. 3). Also, the control block 51 recognizes the pilot period $T_p$ of the pilot signals in P2 on the basis of the recognized FFT size of P2 and transmission mode of P2, and sends the pilot period $T_p$ thus recognized to the vector sum computation block 57.

The control block 51 then obtains the P2 subcarrier spacing $D_2$ from the FFT size of P2. Also, using the quotient $D_1/D_2$ (i.e., from division of the P1 subcarrier spacing $D_1$ by the P2 subcarrier spacing $D_2$), the control block 51 acquires the minimum value (MIN) of the offset amount (offset) in accordance with the expression MIN=−INT[$(D_1/D_2)/2$] and the maximum amount (MAX) in keeping with the expression MAX=+INT[$(D_1/D_2)/2$].

Furthermore, the control block 51 feeds the minimum (MIN) and maximum (MAX) values of the offset amount (offset) to the vector sum computation block 57. From step S31, control is passed on to step S32.

In step S32, the PRBS generation block 52, BPSK modulation block 53, multiplication block 54, and phase detection block 55 obtain the subcarrier phase subsequent to the PRBS decoding process with regard to each of the subcarriers held by P2 fed from the offset correction block 13 (FIG. 3). The subcarrier phases thus acquired are sent to the mapping block 56.

From step S32, control is passed on to step S33. In step S33, the mapping block 56 maps each subcarrier to a location on the circumference of a unit circle centering on the origin of the IQ constellation, the location being determined by rotation by the phase of the subcarrier having undergone the PRBS decoding process, the phase being sent from the phase detection block 55. The mapping block 56 proceeds to obtain the phase vector starting at the origin and ending at the mapping point to which the subcarrier in question has been mapped.

The mapping block 56 further supplies the vector sum computation block 57 with the phase vector acquired with regard to each of the subcarriers in P2. From step S33, control is passed on to step S34.

In step S34, the vector sum computation block 57 sets the offset amount (offset) to the minimum value (MIN) fed from the control block 51. Control is then passed on to step S35.

In step S35, using the phase vectors of the P2 subcarriers from the mapping block 56, the vector sum computation block 57 computes the sum vector summing up the phase vectors of the subcarriers (subsequent to the PRBS decoding process) at intervals of the pilot period $T_p$ sent from the control block 51, each subcarrier starting from the location determined by shift by the offset amount (offset) from the first subcarrier of P2.

The vector sum computation block 57 then supplies the maximum vector detection block 58 with the sum vector summing up the phase vectors computed with regard to the offset amount (offset) in effect. From step S35, control is passed on to step S36.

In step S36, the vector sum computation block 57 checks to determine whether the offset amount (offset) is equal to the maximum value (MAX).

If in step S36 the offset amount (offset) is not found equal to the maximum value (MAX), i.e., if the offset amount (offset) is smaller than the maximum value, control is passed on to step S37. In step S37, the vector sum computation block 57 increments the offset amount by 1. From step S37, control is returned to step S35 and the subsequent steps are repeated.

If in step S36 the offset amount (offset) is found equal to the maximum value (MAX), i.e., if the sum vector has been computed with regard to each of the offset amounts (offsets) ranging from the minimum value (MIN) to the maximum value (MAX), control is passed on to step S38. In step S38, the maximum vector detection block 58 detects the largest of the sum vectors fed from the vector sum computation block 57, the sum vectors having been computed by the latter as the subcarrier correlation with respect to each of the offset amounts (offsets) ranging from the minimum (MIN) to the maximum (MAX) values.

Also, the maximum vector detection block 58 detects the offset amount (offset) corresponding to the largest sum vector (i.e., maximum subcarrier correlation) as the P2 carrier shift amount. The P2 carrier shift amount thus detected is sent to the offset correction block 15 (FIG. 3).

Thereafter, the control block 51 waits for the next P2 included in the OFDM frequency domain signal to be supplied from the offset correction block 13 (FIG. 3) to the preamble processing block 19. From step S38, control is returned to step S31 and the subsequent steps are repeated.

As described above, the sum vector is computed as the sum of the phase vectors each representing the P2 subcarrier correlation with regard to each of the offset amounts (offsets) ranging from the minimum value (MIN) to the maximum value (MAX). The largest of these sum vectors is then detected so as to estimate the carrier shift amount with required accuracy. In this manner, the "coarse" carrier shift amount is estimated rapidly and with the degree of accuracy necessary for the FFT size of P2.

Furthermore, it is possible accurately to detect carrier shift amounts that may be smaller than −INT[$(T_p−1)/2$] or larger than +INT[$(T_p−1)/2$].

For purpose of simplification and illustration, FIG. 15 shows the offset amount (offset) to be changed successively from the minimum value (MIN) to the maximum value (MAX) when the sum of the phase vectors of the subcarriers at intervals of the pilot period $T_p$ subsequent to the PRBS decoding process is being computed. In practice, however, the sum of the phase vectors of the subcarriers at intervals of the pilot period $T_p$ may be computed parallelly with regard to each of the offset amounts (offsets) ranging from the minimum value (MIN) to the maximum value (MAX).

Also in FIG. 15, it is assumed that only one P2 is included in the T2 frame and that the sum of the phase vectors of the subcarriers at intervals of the pilot period $T_p$ is computed from one P2 as the subcarrier correlation with regard to the offset amount (offset) in effect. Alternatively, if the T2 frame contains a plurality of P2's, then the sum of the phase vectors from each of the multiple P2's may be computed. The cumulative total or leaky integral of the sums of the phase vectors from the multiple P2's may then be acquired, and the result may be adopted as the subcarrier correlation.

In the foregoing paragraphs, the subcarrier correlation was shown to be computed using all subcarriers included in P2 at intervals of the pilot period $T_p$. Alternatively, some of the subcarriers included in P2 at intervals of the pilot period $T_p$ may be thinned out before the subcarriers are submitted to the subcarrier correlation computation.

As described, the pilot signals of P2 are signals obtained by BPSK-modulating the exclusive-OR between the PRBS's in the direction of frequencies and the PN sequences in the direction of time. Thus if the absolute phase of each pilot signal in P2 were to be obtained, the pilot signal would first have to be multiplied by the pilot signal by the PRBS (i.e., by rotating the phase of the pilot signal by 0 or by $\pi$ depending on the bit of the PRBS) and also by the PN sequence. The product of the multiplication would then be used to find the absolute phase of the pilot signal.

However, according to the second estimation method (as with the third estimation method), the absolute phases of the pilot signals in P2 are not needed. Instead, relative phases need only be acquired illustratively in reference to the pilot signal with the lowest frequency in P2 being assumed to be 0. This makes it possible to estimate the carrier shift amount with the degree of accuracy necessary for the FFT size of P2 without performing multiplications of PN sequences.

[Third Method for Estimating the Carrier Shift Amount]

FIGS. 16A, 16B, 16C, 16D and 16E are schematic views explanatory of the third estimation method for estimating the carrier shift amount based on the subcarrier correlation computed using subcarrier phase differences.

According to the second estimation method, as discussed above, it is possible to detect significant carrier shift amounts that may be smaller than $-\text{INT}[(T_p-1)/2]$ or larger than $+\text{INT}[(T_p-1)/2]$, rapidly and with the degree of accuracy necessary for the FFT size of P2.

Meanwhile, jitters occurring at the location where the FFT computation block 12 starts computing FFT of P2 (FFT window trigger jitters) or a frequency shift incurred when the OFDM time domain signal subject to FFT computation is being sampled (residual timing offset) may constitute a factor for causing the phases of the subcarriers (symbol) in one OFDM signal to rotate (called the phase rotation factor hereunder).

FIG. 16A shows typical phases of pilot signals (constituted by subcarriers) in one OFDM symbol of P2 subsequent to the PRBS decoding process where the phase rotation factor exists.

If the phase rotation factor is present, the phases of the PRBS-decoded pilot signals increase at a constant gradient in proportion to frequencies as illustrated in FIG. 16A.

In the example of FIG. 16A, the phases of the PRBS-decoded pilot signals are inclined in a manner rising by $\Delta\theta$ for the subcarriers of the pilot period $T_p$ (six subcarriers in FIG. 16A).

FIG. 16B shows typical phase vectors of P2 pilot signals in the IQ constellation where the phase rotation factor exists.

Suppose now that one of the P2 pilot signals is highlighted (i.e., regarded as the pilot signal of interest) and that the phase of the pilot signal of interest is 0.

In that case, the pilot signal set apart from the pilot signal of interest by the subcarriers of the pilot interval $T_p$ illustratively in the direction of higher frequencies (this pilot signal is called the next pilot signal) has a phase increased by the gradient of $\Delta\theta$ from the phase of the pilot signal of interest ($\Delta\theta = 0 + \Delta\theta$).

Further, the pilot signal set part from the next pilot signal by the subcarriers of the pilot interval $T_p$ in the direction of higher frequencies (this pilot signal is called the pilot signal after next) has a phase increased by the gradient of $\Delta\theta$ from the phase $\Delta\theta$ of the next pilot signal ($2\Delta\theta = \Delta\theta + \Delta\theta$).

In this manner, where the phase rotation factor is present, the phases of the pilot signals rotate in units of the gradient of $\Delta\theta$.

FIG. 16C shows how the phases of pilot signals typically rotate in units of the gradient of $\Delta\theta$ as discussed above.

Illustratively, if the phases of all PRBS-decoded pilot signals in one OFDM symbol of P2 make one rotation, then the resulting sum vector can turn out to be a vector of a small magnitude (i.e., 0). This makes it difficult to detect the carrier shift amount.

According to the third estimation method, the difference in phase between each of the subcarriers held by P2 on the one hand and the subcarrier set apart from the subcarrier in question by the pilot period $T_p$ on the other hand is detected. The subcarrier of interest is then mapped to a location on the circumference of, say, a unit circle centering on the origin of the IQ constellation, the location being determined by rotation by the phase difference regarding the subcarrier in question. Thereafter, a phase difference vector is obtained which starts (or ends) at the origin and ends (or starts) at the mapping point to which the subcarrier of interest has been mapped.

Also according to the third estimation method, with regard to each of a plurality of offset amounts (offsets) ranging from the minimum value (MIN) to the maximum value (MAX), a phase difference vector is obtained between each of the subcarriers at intervals of the pilot period $T_p$ on the one hand, and the starting location reached by shift by the offset amount (offsets) in effect from the first subcarrier of P2 on the other hand. The phase difference vectors thus acquired are summed up as the subcarrier correlation.

The third estimation method further involves detecting the largest of the sum vectors each summing up the phase difference vectors obtained with regard to each of the plurality of offset amounts (offsets). The offset amount (offsets) corresponding to the largest sum vector is detected as the P2 carrier shift amount.

FIG. 16D shows a typical phase difference vector.

Where the phase of a PRBS-decoded pilot signal is rotated by the gradient of $\Delta\theta$ due to the presence of the phase rotation factor, the phase difference vector of the pilot signal in question has a magnitude of 1 and a gradient (deflection angle) of $\Delta\theta$ as illustrated in FIG. 16D.

As described above, the sum vector summing up the phase difference vectors of pilot signals (constituted by the corresponding subcarriers) is a vector of a large magnitude.

FIG. 16E shows a typical sum vector summing up the phase difference vectors of such pilot signals (composed of the subcarriers).

The phase difference vectors of all pilot signals having undergone the PRBS decoding process turn out to be vectors each oriented to have the gradient of $\Delta\theta$. The sum vector summing up these phase difference vectors of the subcarriers at intervals of the pilot period $T_p$ thus has a large magnitude as shown in FIG. 16E, each phase difference vector being obtained between each subcarrier, i.e., pilot signal and the starting location determined by shift by each offset amount (offsets) from the first subcarrier of P2.

On the other hand, if the subcarrier at the starting location reached by shift by the offset amount (offsets) from the first subcarrier of P2 is not a pilot signal but a data subcarrier, then the subcarriers at intervals of the pilot period $T_p$ starting from the shifted location are all data subcarriers. In that case, the phase difference vectors of these subcarriers at intervals of the pilot period $T_p$ are oriented in diverse directions, each vector having the magnitude of 1.

As a result, when the subcarrier at the location reached by shift by the offset amount (offset) from the first subcarrier of P2 is a data subcarrier, the subcarriers at intervals of the pilot period $T_p$ starting from the shifted location provide phase difference vectors which, when summed up, constitute the sum vector of a small magnitude, e.g., 0.

Thus after the sum vectors are obtained from the phase difference vectors each acquired with regard to each of a plurality of offset amounts (offsets) ranging from the minimum value (MIN) to the maximum value (MAX), the largest of the sum vectors is detected as the P2 carrier shift amount.

According to the third estimation method, as with the case of the second estimation method, it is possible to detect accurately significant carrier shift amounts that may exceed the pilot period $T_p$, in the manner discussed above.

[Preamble Processing Block 19 Detecting the Carrier Shift Amount Using the Third Estimation Method]

FIG. 17 is a block diagram showing a typical structure of the preamble processing block 19 (FIG. 3) for detecting the carrier shift amount using the third estimation method.

In FIG. 17, the blocks that correspond to those in FIG. 11 are designated by like reference numerals, and their descriptions will be omitted hereunder where redundant.

The preamble processing block 19 in FIG. 17 is common to its counterpart in FIG. 11 in that it contains the control block 51, PRBS generation block 52, BPSK modulation block 53, multiplication block 54, and phase detection block 55.

On the other hand, the preamble processing block 19 in FIG. 17 is different from its counterpart in FIG. 11 in that it has a phase difference detection block 81, a mapping block 82, a vector sum computation block 83, and a maximum vector detection block 84 in place of the mapping block 56, vector sum computation block 57, and maximum vector detection block 58.

The control block 51 in FIG. 17, as with its counterpart in FIG. 11, controls the blocks (ranging from the PRBS generation block 52 to the phase detection block 55 and from the phase difference detection block 81 to the maximum vector detection block 84) making up the preamble processing block 19.

Also, the control block 51 recognizes the pilot period $T_p$ of the pilot signals in P2 like its counter part in FIG. 11. The control block 51 further obtains the minimum (MIN) and maximum (MAX) values of the offset amount (offset) through the use of a quotient $D_1/D_2$ acquired by the division of the subcarrier spacing $D_1$ of P1 by the subcarrier spacing $D2$ of $P_2$.

The control block 51 feeds the pilot period Tp to the phase difference detection block 81 and vector sum computation block 83. The control block 51 also supplies the minimum value (MIN) and maximum value (MAX) of the offset amount (offset) to the vector sum computation block 83.

The blocks ranging from the PRBS generation block 52 to the multiplication block 55 perform a PRBS decoding process that multiplies, by the modulated signal from the BPSK modulation block 53, each of the subcarriers held by P2 in the OFDM frequency domain signal from the offset correction block 13 (FIG. 3). The blocks 52 through 55 also detect the phases of the PRBS-decoded subcarriers, and supply the phase difference detection block 81 with the detected phases.

The phase difference detection block 81 detects (i.e., computes) the phase difference between each of the subcarriers held by P2 on the one hand and the subcarrier set part from the subcarrier in question by the pilot period $T_p$ supplied from the control block 51 on the other hand, through the use of the subcarrier phases fed from the phase detection block 55. The phase difference thus detected is sent to the mapping block 82.

The mapping block 82 maps each subcarrier to a location on the circumference of, say, a unit circle centering on the origin of the IQ constellation, the location being determined by rotation by the subcarrier phase difference supplied from the phase difference detection block 81. A phase difference vector is then obtained which starts at the origin and ends at the mapping point to which the subcarrier in question has been mapped. The mapping block 82 proceeds to supply the vector sum computation block 83 with the phase difference vector acquired with regard to each of the P2 subcarriers.

Using the phase difference vectors of the subcarriers in one OFDM symbol of P2 fed from the mapping block 82 with regard to each of a plurality of offset amounts (offsets) ranging from the minimum (MIN) to the maximum (MAX) values (=MIN, MIN+1, ... MAX−1, MAX) coming from the control block 51, the vector sum computation block 83 computes as the subcarrier correlation the sum vector summing up the phase difference vectors of the subcarriers at intervals of the pilot period $T_p$ fed from the control block 51 and starting at the location determined by shift by the offset amount (offset) from the first subcarrier of P2. The sum vectors thus acquired are sent to the maximum vector detection block 84.

The maximum vector detection block 84 detects the largest (in magnitude) of the sum vectors supplied by the vector sum computation block 83 with respect to each of the multiple offset amounts (offsets). The maximum vector detection block 84 then detects the offset amount (offsets) corresponding to the largest sum vector as the P2 carrier shift amount, and sends the detected P2 carrier shift amount to the offset correction block 15 (FIG. 3).

Figure 18:
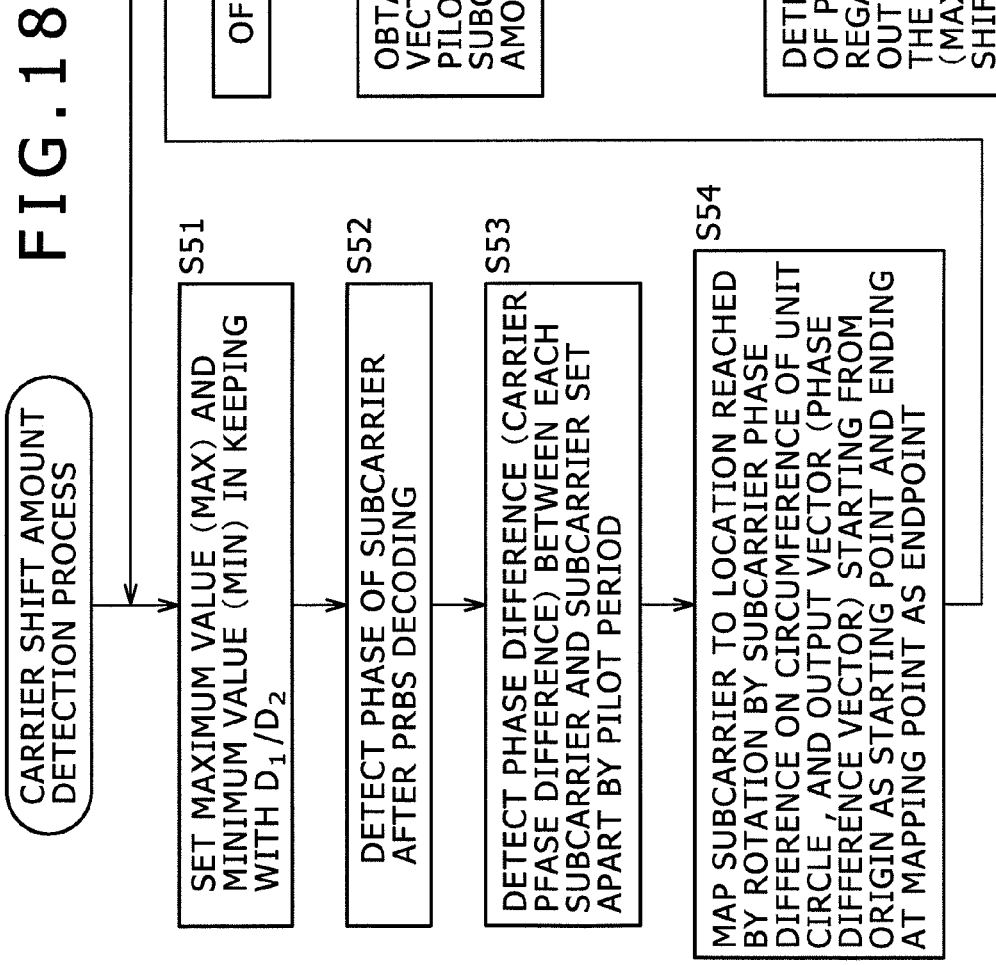
FIG. 18 is a flowchart explanatory of a carrier shift amount detection process for detecting the carrier shift amount using the third estimation method.

FIG. 18 is a flowchart explanatory of the carrier shift amount detection process performed by the preamble processing block 19 in FIG. 17.

Based on the symbol type fed from the symbol type estimation block 18 (FIG. 3), the control block 51 recognizes the supply timing at which the offset correction block 13 (FIG. 3) supplies the preamble processing block 19 with P2 included in the OFDM frequency domain signal.

When the supply timing is reached, i.e., when the OFDM frequency domain signal supplied by the offset correction block 13 (FIG. 3) to the multiplication block 54 becomes P2, the control block 51 in step S51 recognizes the FFT size and transmission mode (SISO or MISO) of P2 based on S1 and S2 from the preamble processing block 16 (FIG. 3). The control block 51 also recognizes the pilot period $T_p$ of the pilot signals in P2 on the basis of the FFT size of P2 and transmission mode of P2, and feeds the recognized pilot period $T_p$ to the vector sum computation block 83.

The control block 51 also obtains the subcarrier spacing $D_2$ of P2 illustratively based on the FFT size of P2. Furthermore, using the quotient $D_1/D_2$ from the division of the subcarrier spacing $D_1$ of P1 by the subcarrier spacing $D_2$ of P2, the control block 51 acquires the minimum value (MIN) in accordance with the expression MIN=−INT[($D_1/D_2$)/2] and the maximum value (MAX) in keeping with the expression MAX=+INT[($D_1/D_2$)/2].

The control block 51 then sends the minimum (MIN) and maximum (MAX) values of the offset amount (offset) to the vector sum computation block 83. From step S51, control is passed on to step S52.

In step S52, the PRBS generation block 52, BPSK modulation block 53, multiplication block 54, and phase detection block 55 obtain the phase of each of the subcarriers held by P2 fed from the offset correction block 13 (FIG. 3) following the PRBS decoding process. The subcarrier phases thus acquired are supplied to the phase difference detection block 81.

From step S52, control is passed on to step S53. In step S53, using the subcarrier phases fed from the phase detection block 55, the phase difference detection block 81 detects the phase difference between each of the subcarriers held by P2 on the one hand and the subcarrier set apart from the subcarrier in question by the pilot period Tp supplied from the control block 51.

Also, the phase difference detection block 81 supplies the mapping block 82 with the phase difference detected with regard to each of the subcarriers held by P2 (i.e., subcarrier phase differences). From step S53, control is passed on to step S54.

In step S54, the mapping block 82 maps each subcarrier to a location on the circumference of a unit circle centering on the origin of the IQ constellation, the location being determined by rotation by the phase difference of the PRBS-decoded subcarrier sent from the phase difference detection block 81. The mapping block 82 proceeds to obtain the phase difference vector starting at the origin and ending at the mapping point to which the subcarrier in question has been mapped.

The mapping block 82 then supplies the vector sum computation block 83 with the phase difference vectors obtained with regard to each of the subcarriers in P2. From step S54, control is passed on to step S55.

In step S55, the vector sum computation block 83 sets the offset amount (offset) to the minimum value (MIN) sent from the control 51. From step S55, control is passed on to step S56.

In step S56, using the phase difference vectors of the P2 subcarriers from the mapping block 82, the vector sum computation block 83 computes the sum vector summing up the phase difference vectors of the subcarriers (subsequent to the PRBS decoding process) at intervals of the pilot period $T_p$ sent from the control block 51, each subcarrier starting from the location reached by shift by the offset amount (offset) from the first subcarrier of P2.

The vector sum computation block 83 then supplies the maximum vector detection block 84 with the sum vector summing up the phase difference vectors computed with regard to the offset amount (offset) in effect. From step S56, control is passed on to step S57.

In step S57, the vector sum computation block 83 checks to determine whether the offset amount (offset) is equal to the maximum value (MAX).

If in step S57 the offset amount (offset) is not found equal to the maximum value (MAX), i.e., if the offset amount (offset) is smaller than the maximum value, control is passed on to step S58. In step S58, the vector sum computation block 83 increments the offset amount (offset) by 1. From step S58, control is returned to step S56 and the subsequent steps are repeated.

If in step S57 the offset amount (offset) is found equal to the maximum value (MAX), i.e., if the sum vector has been computed with regard to each of the offset amounts (offsets) ranging from the minimum value (MIN) to the maximum value (MAX), control is passed on to step S59. In step S59, the maximum vector detection block 84 detects the largest of the sum vectors fed from the vector sum computation block 83, the sum vectors having been computed by the latter as the subcarrier correlation with respect to each of the offset amounts (offsets) ranging from the minimum (MIN) to the maximum (MAX) values.

Also, the maximum vector detection block 84 detects the offset amount (offset) corresponding to the largest sum vector (i.e., maximum subcarrier correlation) as the P2 carrier shift amount. The P2 carrier shift amount thus detected is sent to the offset correction block 15 (FIG. 3).

Thereafter, the control block 51 waits for the next P2 included in the OFDM frequency domain signal to be supplied from the offset correction block 13 (FIG. 3) to the preamble processing block 19. From step S59, control is returned to step S51 and the subsequent steps are repeated.

As described above, the sum vector is computed as the sum of the phase difference vectors each representing the P2 subcarrier correlation with regard to each of the offset amounts (offsets) ranging from the minimum value (MIN) to the maximum value (MAX). The largest of these sum vectors is then detected so as to estimate the carrier shift amount with required accuracy. In this manner, the "coarse" carrier shift amount is estimated rapidly and with the degree of accuracy necessary for the FFT size of P2.

Furthermore, it is possible accurately to detect carrier shift amounts that may be smaller than −INT[($T_p$−1)/2] or larger than +INT[($T_p$−1)/2].

For purpose of simplification and illustration, FIG. 18 shows the offset amount (offset) to be changed successively from the minimum value (MIN) to the maximum value (MAX) when the sum of the phase difference vectors of the subcarriers at intervals of the pilot period $T_p$ subsequent to the PRBS decoding process is being computed. In practice, however, the sum of the phase difference vectors of the subcarriers at intervals of the pilot period $T_p$ may be computed parallelly with regard to each of the offset amounts (offsets) ranging from the minimum value (MIN) to the maximum value (MAX).

Also in FIG. 18, it is assumed that only one P2 is included in the T2 frame and that the sum of the phase difference vectors of the subcarriers at intervals of the pilot period $T_p$ is computed from one P2 as the subcarrier correlation with regard to the offset amount (offset) in effect. Alternatively, if the T2 frame contains a plurality of P2's, then the sum of the phase difference vectors from each of the multiple P2's may be computed. The cumulative total or leaky integral of the sums of the phase vectors from the multiple P2's may then be acquired, and the result may be adopted as the subcarrier correlation.

In the foregoing paragraphs, the subcarrier correlation was shown to be computed using all subcarriers included in P2 at intervals of the pilot period $T_p$. Alternatively, some of the subcarriers included in P2 at intervals of the pilot period $T_p$ may be thinned out before the subcarriers are submitted to the subcarrier correlation computation.

As described above, the preamble processing block 19 can use subcarriers spaced at intervals other than the widest of the subcarrier spacings defined by DVB-T2 or like standards. The preamble processing block 19 thus detects the carrier shift amount using the correlations of the subcarriers included in one P2 that contains pilot signals at intervals of a predetermined pilot period $T_p$. This makes it possible to detect the carrier shift amount quickly and with required accuracy.

More specifically, the preamble processing block 19 can detect the carrier shift amount with the degree of accuracy necessary for the FFT size of P2, using illustratively the first of the OFDM symbols of P2 (or the sole OFDM symbol in the T2 frame if only one OFDM symbol of P2 is included therein) included in the T2 frame.

Therefore, the signal processing apparatus of FIG. 3 can detect the carrier offset amount with the degree of accuracy necessary for the FFT size of P2 while the buffer 14 is buffering the first single OFDM symbol of P2 included in the OFDM frequency domain signal, before correcting the detected carrier offset amount. This makes it possible to establish synchronization quickly.

Meanwhile, one T2 frame has a maximum time length of 250 ms. It might happen that upon receipt of a T2 frame at a given point in time, the signal processing apparatus cannot detect the carrier shift amount with the degree of accuracy necessary for the FFT size of P2. In such a case, the signal processing apparatus has to wait a long time for the next T2 frame to be received before the processing.

In the case of the signal processing apparatus of FIG. 3, while the first single OFDM symbol of P2 included in a T2 frame received at a given point in time is being buffered, it is possible to detect the carrier offset amount with the degree of accuracy necessary for the FFT size of P2 in question. This feature eliminates the need for waiting a long time before the next T2 frame is received and processed as in the preceding case.

[Another Typical Structure of the Signal Processing Apparatus]

Figure 19:
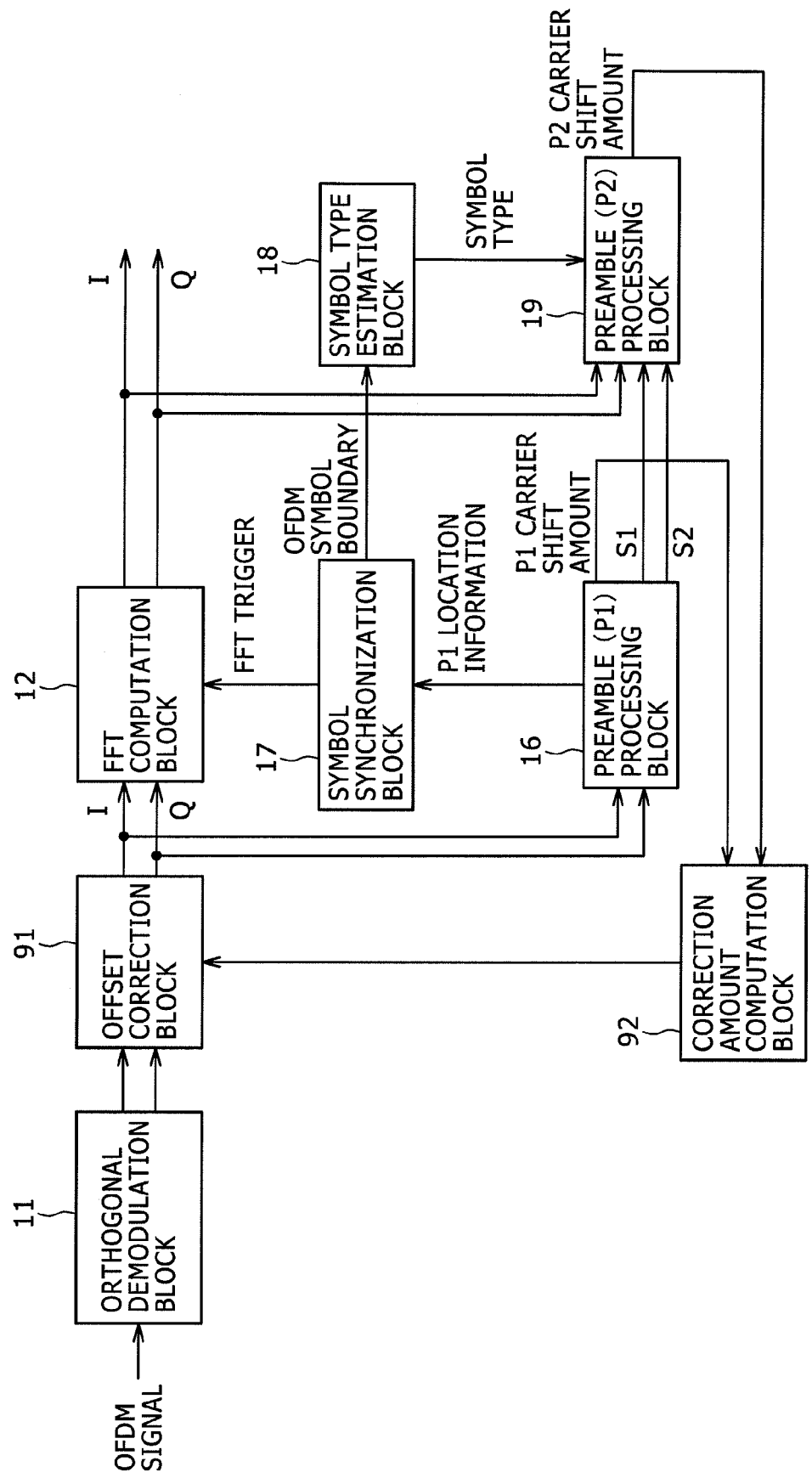
FIG. 19 is a block diagram showing a typical structure of a signal processing apparatus as another embodiment of the present invention.

FIG. 19 is a block diagram showing a typical structure of the signal processing apparatus as another embodiment of the present invention.

In FIG. 19, the blocks that correspond to those in FIG. 3 are designated by like reference numerals, and their descriptions will be omitted hereunder where redundant.

In the signal processing apparatus of FIG. 3, the OFDM signal is corrected (i.e., offset correction) under feed-forward control. In the signal processing apparatus of FIG. 19, by contrast, the OFDM signal is corrected under feedback control.

In FIG. 19, the signal processing apparatus includes an orthogonal demodulation block 11, an FFT computation block 12, a preamble processing block 16, a symbol synchronization block 17, a symbol type estimation block 18, a preamble processing block 19, an offset correction block 91, and a correction amount computation block 92.

The orthogonal demodulation block 11 digital-orthogonal demodulates the OFDM signal supplied. The I and Q components of the resulting OFDM time domain signal, which is a baseband OFDM signal, are sent from the orthogonal demodulation block 11 to the offset correction block 91.

The offset correction block 91 corrects the OFDM time domain signal from the orthogonal demodulation block 11 in accordance with a correction amount fed from the correction amount computation block 92 (i.e., for offset correction). The OFDM time domain signal thus corrected is sent from the offset correction block 91 to the FFT computation block 12 and preamble processing block 16.

In accordance with FFT trigger information fed from the symbol synchronization block 17, the FFT computation block 12 extracts the OFDM time domain signal of the FFT size from the OFDM time domain signal coming from the orthogonal demodulation block 11, and performs FFT computation on the extracted OFDM time domain signal.

The FFT computation block 12 supplies the preamble processing block 19 with the OFDM frequency domain signal obtained through the FFT computation.

Besides being fed to the preamble processing block 19, the OFDM frequency domain signal derived from the FFT computation is sent to those blocks, not shown, which perform such necessary processes as equalization and error correction.

Meanwhile, the preamble processing block 16 detects P1 from the OFDM time domain signal sent from the offset correction block 91. Using P1 thus detected, the preamble processing block 16 estimates "coarse" and "fine" carrier shift amounts.

The preamble processing block 16 then supplies the correction amount computation block 92 with a P1 carrier shift amount that includes the "coarse" carrier shift amount and "fine" carrier shift amount estimated by use of P1 with regard to the FFT size (1 K) of the P1 in question.

Also, the preamble processing block 16 extracts S1 and S2 from P1 and supplies the extracted S1 and S2 to the preamble processing block 19.

Furthermore, the preamble processing block 16 feds the symbol synchronization block 17 with P1 location information which is included in the OFDM time domain signal from the offset correction block 91 and which represents the location of P1 on the OFDM time domain signal in question, as well as the FFT size included in P1.

From the P1 location information and FFT size supplied by the preamble processing block 16, the symbol synchronization block 17 generates FFT trigger information and feeds it to the FFT computation block 12.

Also, the symbol synchronization block 17 estimates the location of the OFDM symbol boundary (i.e., boundary location), and sends a signal representative of the boundary location to the symbol type estimation block 18 as a symbol synchronization signal.

Based on the symbol synchronization signal and the like from the symbol synchronization block 17, the symbol type estimation block 18 estimates the symbol type of the symbols in the OFDM frequency domain signal fed from the FFT computation block 12 to the preamble processing block 19. The symbol type thus estimated is sent to the preamble processing block 19.

The preamble processing block 19 performs a carrier shift amount detection process for estimating (detecting) the "coarse" carrier shift amount with regard to the FFT size of P2 included in the OFDM frequency domain signal coming from the FFT computation block 12. The carrier shift amount detection process is performed using the OFDM frequency domain signal from the FFT computation block 12, S1 and S2 from the preamble processing block 16, and the symbol type from the symbol type estimation block 18.

The preamble processing block 19 sends the P2 carrier shift amount obtained through the carrier shift amount detection process to the correction amount computation block 92.

The correction amount computation block 92 computes an OFDM signal correction amount that will set to zero the P1 carrier shift amount from the preamble processing block 16 and the P2 carrier shift amount from the preamble processing block 19. The correction amount thus computed is sent to the offset correction block 91.

In the manner described above, the offset correction block 91 corrects the OFDM time domain signal coming from the orthogonal demodulation block 11 in accordance with the correction amount supplied by the correction amount computation block 92.

The above-described correction of the OFDM signal is performed under feedback control by the signal processing apparatus of FIG. 19 in a manner estimating the carrier shift amount just as rapidly and with the same degree of accuracy necessary for demodulating P2 as the correction of the OFDM signal carried out under feed-forward control by the signal processing apparatus of FIG. 3.

With this embodiment of the invention, the carrier shift amount is detected using the pilot signals (and edge pilot signals) of P2. Alternatively, the carrier shift amount may be detected using SP (Scattered Pilot) signals, CP (Continual Pilot) signals, FCP (Frame Closing Pilot) signals, or the like.

Also with this embodiment of the present invention, the detection of the carrier shift amount is targeted at the OFDM signal defined by DVB-T2. Alternatively, the detection of the carrier shift amount using the above-mentioned phase vectors or phase difference vectors may be targeted at the OFDM signal of multi-carrier systems whereby random sequences such as the PRBS are disposed as pilot signals in the direction of subcarriers (i.e., in the direction of frequencies).

[Typical Structure of the Reception System]

Figure 20:
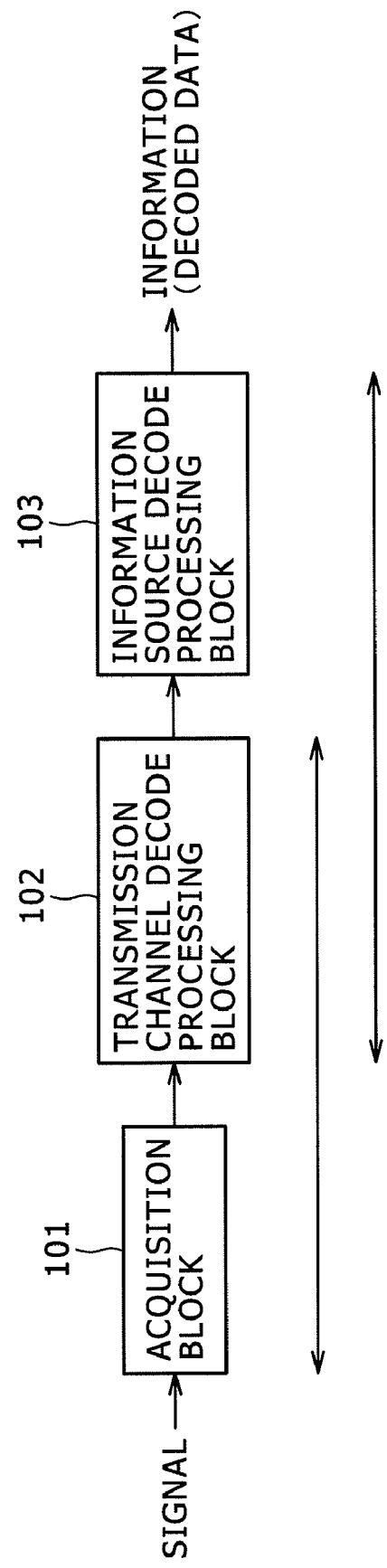
FIG. 20 is a block diagram showing a typical structure of a first embodiment of a reception system to which the present invention is applied.

FIG. 20 is a block diagram showing a typical structure of the first embodiment of the reception system to which the present invention is applied.

In FIG. 20, the reception system is made up of an acquisition block 101, a transmission channel decode processing block 102, and an information source decode processing block 103.

The acquisition block 101 acquires illustratively data constituting TV broadcast programs or the like in the form of OFDM-modulated signals known as OFDM signals.

Specifically, for example, Broadcasting stations and Web servers, not shown, may transmit the OFDM signal to be acquired by the acquisition block 101.

Where the OFDM signal is transmitted illustratively from broadcasting stations using terrestrial waves, satellite waves, or via CATV (Cable Television) networks, the acquisition block 101 may be composed of a tuner or an STB (Set Top Box). Where the OFDM signal is transmitted from Web servers in multicast fashion such as IPTV (Internet Protocol Television), the acquisition block 101 may be typically constituted by a network interface I/F (Inter face) such as NIC (Network Interface Card).

The acquisition block 101 acquires the OFDM signal via transmission channels such as terrestrial digital broadcasts, satellite digital broadcasts, CATV network, or the Internet, not shown. The OFDM signal thus acquired is forwarded to the transmission channel decode processing block 102.

The transmission channel decode processing block 102 performs a transmission channel decoding process on the OFDM signal acquired by the acquisition block 101 over the transmission channel, the transmission channel decoding process including at least demodulation and an error-correcting process for correcting errors that may have occurred on the transmission channel. As a result, the signal thus acquired is supplied to the information source decode processing block 103.

That is, the OFDM signal acquired by the acquisition block 101 over the transmission channel has at least undergone error correcting coding for correcting errors that may take place on the transmission channel. The transmission channel decode processing block 102 performs the transmission channel decoding process such as demodulation and error correction on that OFDM signal.

Typical error correcting coding schemes include LDPC coding and Reed-Solomon coding.

The information source decode processing block 103 performs an information source decoding process on the signal having undergone the transmission channel decoding process, the information source decoding process including at least a process for expanding compressed information to the original information.

That is, the OFDM signal acquired by the acquisition block 101 over the transmission channel may have been compression-coded for data compression whereby the amount of data or information such as images and sounds is reduced. In that case, the information source decode processing block 103 performs the information source decoding process such as the process of expanding compressed signal to the original information (expansion process) on the signal that has undergone the transmission channel decoding process.

If the OFDM signal acquired by the acquisition block 101 via the transmission channel is not found compression-coded, then the information source decode processing block 103 does not perform the process of expanding compressed information back to its original format.

A typical expansion process may be MPEG decoding. The transmission channel decoding process may include descrambling and the like in addition to the expansion process.

In the reception system structured as described above, the acquisition block 101 acquires via the transmission channel the OFDM signal which represents the data making up images and sounds and the like having undergone compression coding such as MPEG coding and which was subjected to error-correcting coding such as LDPC coding. The OFDM signal thus acquired is forwarded to the transmission channel decode processing block 102.

The transmission channel decode processing block 102 performs the transmission channel decoding process on the OFDM signal coming from the acquisition block 101, the transmission channel decoding process including the same demodulation and error correction processes as those carried out by the signal processing apparatus shown in FIG. 3 or in FIG. 19 as the demodulation apparatus. The signal resulting from the transmission channel decoding process is supplied to the information source decode processing block 103.

The information source decode processing block 103 performs the information source decoding process such as MPEG decoding on the signal fed from the transmission channel decode processing block 102. Images and/or sounds acquired through the process are then output by the information source decode processing block 103.

The reception system of FIG. 20 structured as discussed above may illustratively be applied to TV tuners for receiving digital TV broadcasts.

The acquisition block 101, transmission channel decode processing block 102, and information source decode processing block 103 may each be structured as an independent apparatus (a hardware module such as an IC (Integrated Circuit) or a software module).

Some or all of the acquisition block 101, transmission channel decode processing block 102, and information source decode processing block 103 may be set up in combination as an independent apparatus. That is, a set of the acquisition block 101 and transmission channel decode processing block 102, a set of the transmission channel decode processing block 102 and information source decode processing block 103, or a set of the acquisition block 101, transmission channel decode processing block 102, and information source decode processing block 103 may be formed into a single independent apparatus.

Figure 21:
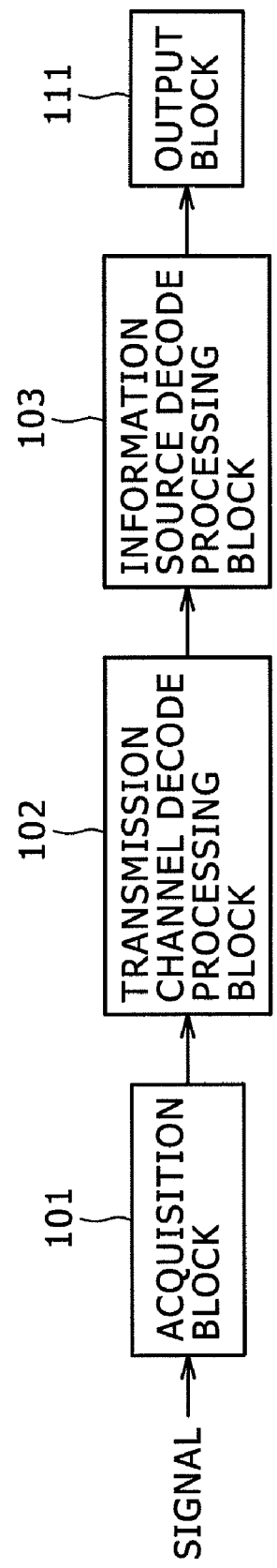
FIG. 21 is a block diagram showing a typical structure of a second embodiment of the reception system to which the present invention is applied.

FIG. 21 is a block diagram showing a typical structure of the second embodiment of the reception system to which the present invention is applied.

Of the reference numerals in FIG. 21, those already used in FIG. 20 designate like or corresponding parts, and the descriptions of these parts may be omitted where redundant.

The reception system in FIG. 21 is common to its counterpart in FIG. 20 in that it includes the acquisition block 101, transmission channel decode processing block 102, and information source decode processing block 103. The difference between the two versions of the reception system is that the reception system in FIG. 21 additionally includes an output block 111.

The output block 111 is illustratively composed of a display device for displaying images and/or of speakers for outputting sounds. As such, the output block 111 outputs the images and sounds represented by the signal output from the information source decode processing block 103. In short, what the output block 111 does is to display images and/or output sounds.

The above-described reception system in FIG. 21 may be applied illustratively to TV sets for receiving digital TV broadcasts or to radio receivers for receiving radio broadcasts.

If the signal acquired by the acquisition block 101 is not found to be compression-coded, then the signal output by the transmission channel decode processing block 102 is sent directly to the output block 111, bypassing the information source decode processing block 103.

Figure 22:
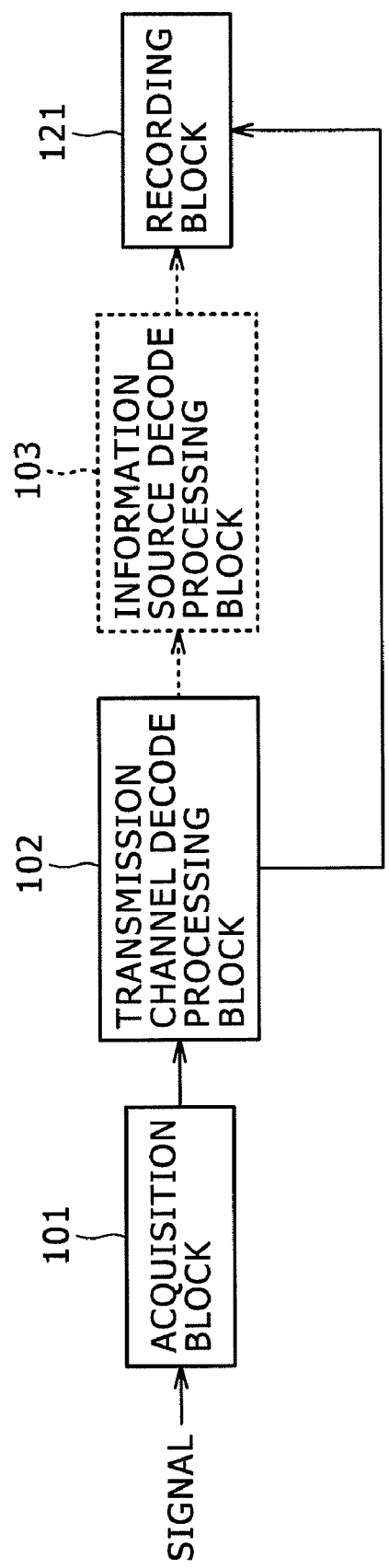
FIG. 22 is a block diagram showing a typical structure of a third embodiment of the reception system to which the present invention is applied.

FIG. 22 is a block diagram showing a typical structure of the third embodiment of the reception system to which the present invention is applied.

Of the reference numerals in FIG. 22, those already used in FIG. 20 designate like or corresponding parts, and the descriptions of these parts may be omitted where redundant.

The reception system in FIG. 22 is common to its counterpart in FIG. 20 in that it includes the acquisition block 101 and transmission channel decode processing block 102.

The difference between the two versions of the reception system is that the reception system in FIG. 22 lacks the information source decode processing block 103 but additionally includes a recording block 121.

The recording block 121 records (i.e., stores) the signal output from the transmission channel decode processing block 102 (such as TS packets of MPEG transport streams) to recording (i.e., storage) media including optical disks, hard disks (magnetic disks), and flash memories.

The above-outlined reception system in FIG. 22 may be applied illustratively to recorders for recording TV broadcasts.

In FIG. 22, the reception system may be structured alternatively to include the information source decode processing block 103. In this setup, the information source decode processing block 103 performs the information source decoding process on the received signal, so that the images and sounds acquired from the decoded signal can be recorded by the recording block 121.

[Explanation of the Computer to Which the Present Invention is Applied]

The series of the processes described above may be executed either by hardware or by software. Where the processes are to be carried out by software, the programs constituting the software are installed into suitable computers for process execution.

FIG. 23 shows a typical structure of a computer to which the present invention is applied and in which suitable programs for executing the series of the above-described processes are installed.

The programs may be recorded in advance on a hard disk 205 or ROM 203 furnished as a built-in recording medium of the computer.

Alternatively, the programs may be stored (recorded) on removable recording media 211 that may be offered as a so-called software package. The removable recording media 211 illustratively include flexible disks, CD-ROM (Compact Disc Read Only Memory), MO (Magneto-Optical) disks, DVD (Digital Versatile Discs), magnetic disks, and semiconductor memories.

Besides being installed from the above-mentioned removable recording media 211 into the computer, the programs may be downloaded to the computer via communication or broadcasting networks and installed onto the internal hard disk 205. That is, the programs may be transferred illustratively from download sites to the computer wirelessly via digital broadcasting satellite or in wired fashion over such networks as LANs (Local Area Networks) and the Internet.

The computer incorporates a CPU (Central Processing Unit) 202 to which an input/output interface 210 is connected via a bus 201.

When a user inputs commands to the CPU 202 through the input/output interface 210 by typically operating an input block 207, the CPU 202 executes corresponding programs stored on the ROM (Read Only Memory) 203. Alternatively, the CPU 202 may load the relevant programs from the hard disk 205 into a RAM (Random Access Memory) 204 for program execution.

The CPU 202 thus performs its processing by following the above-described flowcharts or by utilizing the structures depicted in the block diagrams explained above. The results of the processing may be output from the output block 206, transmitted through a communication block 208, or recorded to the hard disk 205 as required.

The input block 207 is typically made up of a keyboard, a mouse, and a microphone. The output block 206 is constituted illustratively by an LCD (Liquid Crystal Display) and speakers.

In this specification, the processing steps which describe the programs for causing the computer to perform operations may not represent solely the processes that are to be carried out in the depicted sequence in the flowcharts on a time series basis. Specifically, the steps may also represent processes that are conducted parallelly or individually (e.g., in parallel processing or in object-oriented fashion).

The programs may be processed by a single computer (or processor) or by a plurality of computers on a distributed basis. The program may also be transferred to a remote computer or computers for execution.

It should be understood by those skilled in the art that various modifications, combinations, sub-combinations and alterations may occur depending on design requirements and other factor in so far as they are within the scope of the appended claims or the equivalents thereof.

What is claimed is:

1. A signal processing apparatus comprising:
processing means for perforating a carrier shift amount detection process for detecting a carrier shift amount constituting a carrier error used for demodulating an orthogonal frequency division multiplexing signal known as an OFDM signal; and correction means for correcting said OFDM signal in accordance with said carrier shift amount; wherein said OFDM signal includes
- a first preamble signal including subcarriers, and
- a second preamble signal including subcarriers of which the spacing is narrower than the spacing of the subcarriers included in said first preamble signal;

said second preamble signal includes pilot signals which are known signals located at intervals of a predetermined number of subcarriers; and said processing means detects said carrier shift amount using a correlation of said subcarriers included in one such second preamble signal.

2. The signal processing apparatus according to claim 1, wherein said processing means includes:

phase detection means for detecting phases of the subcarriers included in said second preamble signal;

phase difference detection means for detecting a phase difference between a respective subcarrier included in said second preamble signal on the one hand, and a subcarrier spaced from said respective subcarrier by said predetermined number of subcarriers;

mapping means for mapping the subcarrier in question to a location reached by rotating said phase difference on the circumference of a circle centering on the origin of an in phase and quadrature phase plane (IQ constellation), said mapping means further obtaining a phase difference vector of which the starting point is said origin and of which the endpoint is the location to which said subcarrier is mapped;

vector sum computation means configured such that with regard to each of a plurality of offset amounts constituting carrier shift amounts of a predetermined number of subcarriers, said offset amounts ranging from a minimum to a maximum value, said vector sum computation means determines a shifted location reached by shifting each of said offset amounts from the first subcarrier in said second preamble signal, acquires the phase difference vector starting from said shifted location and ending at each of the subcarriers located at intervals of said predetermined number of subcarriers, and sums up the acquired phase difference vectors as the correlation of each of said subcarriers; and a maximum value detection means for detecting a maximum sum out of the sums of said phase difference vectors regarding each of said plurality of offset amounts, said maximum value detection means further detecting the offset amount corresponding to said maximum sum as said carrier shift amount.

3. The signal processing apparatus according to claim 2, wherein said pilot signals included in said second preamble signal are each obtained by modulating a pseudo random binary sequence known as PRBS by binary phase shift keying known as BPSK; and said phase detection means detects the phases of said subcarriers multiplied by the modulated signal obtained by modulating the PRBS sequence by BPSK.

4. The signal processing apparatus according to claim 3, wherein the minimum and the maximum values of said offset amounts are obtained using the quotient of the division of the spacing of the subcarriers in said first preamble signal by the spacing of the subcarriers in said second preamble signal.

5. The signal processing apparatus according to claim 1, wherein said processing means includes:

phase detection means for detecting phases of the subcarriers included in said second preamble signal;

mapping means for mapping each of said subcarriers to a location reached by rotating the phase of the subcarrier in question on the circumference of a circle centering on the origin of an IQ constellation, said mapping means further obtaining a phase vector of which the starting point is said origin and of which the endpoint is the location to which the subcarrier in question is mapped;

vector sum computation means configured such that with regard to each of a plurality of offset amounts constituting carrier shift amounts of a predetermined number of subcarriers, said offset amounts ranging from a minimum to a maximum value, said vector sum computation means determines a shifted location reached by shifting each of said offset amounts from the first subcarrier in said second preamble signal, acquires the phase vector starting at said shifted location and ending at each of the subcarriers located at intervals of said predetermined number of subcarriers, and sums up the acquired phase vectors as the correlation of each of said subcarriers; and maximum value detection means for detecting a maximum sum out of the sums of said phase vectors regarding each of said plurality of offset amounts, said maximum value detection means further detecting the offset amount corresponding to said maximum sum as said carrier shift amount.

6. The signal processing apparatus according to claim 5, wherein said pilot signals included in said second preamble signal are each obtained by modulating a pseudo random binary sequence known as PRBS by binary phase shift keying known as BPSK; and said phase detection means detects the phases of said subcarriers multiplied by the modulated signal obtained by modulating the PRRS sequence by BPSK.

7. The signal processing apparatus according to claim 6, wherein the minimum and the maximum values of said offset amounts are obtained using the quotient of the division of the spacing of the subcarriers in said first preamble signal by the spacing of the subcarriers in said second preamble signal.

8. The signal processing apparatus according to claim 1, wherein said processing means includes:

power detection means for detecting a power value corresponding to the power of each of the subcarriers included in said second preamble signal;

sum computation means configured such that with regard to each of a plurality of offset amounts constituting carrier shift amounts of a predetermined number of subcarriers, said offset amounts ranging from a minimum to a maximum value, said sum computation means determines a shifted location reached by shifting each of said offset amounts from the first subcarrier in said second preamble signal, and sums up the power values detected at intervals of said predetermined number of subcarriers relative to said shifted location as the correlation of each of said subcarriers; and maximum value detection means for detecting a maximum sum out of the sums of said power values regarding each of said plurality of offset amounts, said maximum value detection means further detecting the offset amount corresponding to said maximum sum of said power values as said carrier shift amount.

9. The signal processing apparatus according to claim 8, wherein the maximum and the minimum values of said offset amounts are obtained using said predetermined number.

10. The signal processing apparatus according to claim 1, wherein
said signal processing apparatus is subject to a standard called DVB-T2; and
said first and said second preamble signals correspond to P1 and P2, respectively, which are defined by DVB-T2.

11. A signal processing method comprising the steps of:
performing a carrier shift amount detection process, using a signal processing apparatus, for detecting a carrier shift amount constituting a carrier error used for demodulating an orthogonal frequency division multiplexing signal known as the OFDM signal; and
correcting said OFDM signal, using said signal processing apparatus, in accordance with said carrier shift amount; wherein
said OFDM signal includes
a first preamble signal including subcarriers, and
a second preamble signal including subcarriers of which the spacing is narrower than the spacing of the subcarriers included in said first preamble signal;
said second preamble signal includes pilot signals which are known signals located at intervals of a predetermined number of subcarriers; and
said carrier shift amount detection process detects said carrier shift amount using a correlation of said subcarriers included in one such second preamble signal.

12. A reception system comprising:
a transmission channel decode processing block configured to perform a transmission channel decoding process on a signal acquired via a transmission channel, said transmission channel decoding process including at least the process of correcting errors having occurred on said transmission channel; and
an information source decode processing block configured to perform an information source decoding process on the signal having undergone said transmission channel decoding process, said information source decoding process including at least the process of expanding compressed information back to the original information; wherein
said signal acquired via said transmission channel is an orthogonal frequency division multiplexing signal known as an OFDM signal obtained by performing at least compression coding for information compression and error correcting coding for correcting the errors having occurred on said transmission channel;
said transmission channel decode processing block includes
processing means for performing a carrier shift amount detection process for detecting a carrier shift amount constituting a carrier error used for demodulating said OFDM signal, and
correction means for correcting said OFDM signal in accordance with said carrier shift amount;
said OFDM signal includes
a first preamble signal including subcarriers, and
a second preamble signal including subcarriers of which the spacing is narrower than the spacing of the subcarriers included in said first preamble signal:
said second preamble signal includes pilot signals which are known signals located at intervals of a predetermined number of subcarriers; and
said processing means detects said carrier shift amount using a correlation of said subcarriers included in one such second preamble signal.

13. A reception system comprising:
a transmission channel decode processing block configured to perform a transmission channel decoding process on a signal acquired via a transmission channel, said transmission channel decoding process including at least the process of correcting errors having occurred on said transmission channel; and
an output block configured to output images and sounds based on the signal having undergone said transmission channel decoding process; wherein
said signal acquired via said transmission channel is an orthogonal frequency division multiplexing signal known as an OFDM signal obtained by performing at least error correcting coding for correcting the errors having occurred on said transmission channel;
said transmission channel decode processing block includes
processing means for performing a carrier shift amount detection process for detecting a carrier shift amount constituting a carrier error used for demodulating said OFDM signal, and
correction means for correcting said OFDM signal in accordance with said carrier shift amount;
said OFDM signal includes
a first preamble signal including subcarriers, and
a second preamble signal including subcarriers of which the spacing is narrower than the spacing of the subcarriers included in said first preamble signal;
said second preamble signal includes pilot signals which are known signals located at intervals of a predetermined number of subcarriers; and
said processing means detects said carrier shift amount using a correlation of said subcarriers included in one such second preamble signal.

14. A reception system comprising:
a transmission channel decode processing block configured to perform a transmission channel decoding process on a signal acquired via a transmission channel, said transmission channel decoding process including at least the process of correcting errors having occurred on said transmission channel; and
a recording block configured to record the signal having undergone said transmission channel decoding process; wherein
said signal acquired via said transmission channel is an orthogonal frequency division multiplexing signal known as an OFDM signal obtained by performing at least error correcting coding for correcting the errors having occurred on said transmission channel;
said transmission channel decode processing block includes
processing means for performing a carrier shift amount detection process for detecting a carrier shift amount constituting a carrier error used for demodulating said OFDM signal, and
correction means for correcting said OFDM signal in accordance with said carrier shift amount;
said OFDM signal includes
a first preamble signal including subcarriers, and
a second preamble signal including subcarriers of which the spacing is narrower than the spacing of the subcarriers included in said first preamble signal;
said second preamble signal includes pilot signals which are known signals located at intervals of a predetermined number of subcarriers; and said processing means detects said carrier shift amount using it correlation of said subcarriers included in one such second preamble signal.

15. A reception system comprising:

acquisition means for acquiring a signal via a transmission channel; and a transmission channel decode processing block configured to perform a transmission channel decoding process on the signal acquired via said transmission channel, said transmission channel decoding process including at least the process of correcting errors having occurred on said transmission channel; wherein said signal acquired via said transmission channel is an orthogonal frequency division multiplexing signal known as an OFDM signal obtained by performing at least error correcting coding for correcting the errors having occurred on said transmission channel;

said transmission channel decode processing block includes processing means for performing a carrier shift amount detection process for detecting a carrier shift amount constituting a carrier error used for demodulating said OFDM signal, and correction means for correcting said OFDM signal in accordance with said carrier shift amount;

said OFDM signal includes a first preamble signal including subcarriers, and a second preamble signal including subcarriers of which the spacing is narrower than the spacing of the subcarriers included in said first preamble signal;

said second preamble signal includes pilot signals which are known signals located at intervals of a predetermined number of subcarriers; and said processing means detects said carrier shift amount using a correlation of said subcarriers included in one such second preamble signal.

16. A signal processing apparatus comprising:

a processing block configured to perform a carrier shift amount detection process for detecting a carrier shift amount constituting a carrier error used for demodulating an orthogonal frequency division multiplexing signal known as an OFDM signal; and a correction block configured to correct said OFDM signal in accordance with said carrier shift amount; wherein said OFDM signal includes a first preamble signal including subcarriers, and a second preamble signal including subcarriers of which the spacing is narrower than the spacing of the subcarriers included in said first preamble signal;

said second preamble signal includes pilot signals which are known signals located at intervals of a predetermined number of subcarriers; and said processing block detects said carrier shift amount using a correlation of said subcarriers included in one such second preamble signal.

* * * * *